United States Patent [19]
Ellison-Hayashi et al.

[11] Patent Number: 5,456,735
[45] Date of Patent: Oct. 10, 1995

[54] METHOD OF ABRADING WITH BORON SUBOXIDE (BXO) AND THE BORON SUBOXIDE (BXO) ARTICLES AND COMPOSITION USED

[75] Inventors: Cristan Ellison-Hayashi, Salt Lake City, Utah; George T. Emond, Southington, Conn.; Shih Y. Kuo, Salt Lake City, Utah

[73] Assignee: Norton Company, Worcester, Mass.

[21] Appl. No.: 217,402

[22] Filed: Mar. 24, 1994

Related U.S. Application Data

[63] Continuation-in-part of Ser. No. 51,114, Apr. 21, 1993, Pat. No. 5,366,526, which is a continuation-in-part of Ser. No. 920,357, Jul. 28, 1992, Pat. No. 5,330,937, which is a continuation-in-part of Ser. No. 729,467, Jul. 12, 1991, Pat. No. 5,135,892.

[51] Int. Cl.$^6$ .................................................... C09K 3/14
[52] U.S. Cl. ............................... 51/307; 51/309; 423/278
[58] Field of Search .......................... 51/307, 309; 501/1; 423/278

[56] References Cited

U.S. PATENT DOCUMENTS 3,660,031  5/1972  Holcombe et al. ................ 423/278

*Primary Examiner*—Wayne Langel
*Attorney, Agent, or Firm*—Mary E. Porter; Brian Kolkowski

[57] ABSTRACT

A method of removing material from a surface comprising abrading a surface comprising the step of abrading a surface with an abrasive tool or an abrasive powder comprising a boron suboxide (BxO) composition, wherein during the abrading step the boron suboxide (BxO) composition is maintained at low temperatures. The abrasive which is from the boron suboxide (BxO) family of compounds exhibits an unexpectedly high quality of abrading comparable with the highest quality particulate natural and synthetic diamond, which has a hardness about double that of the boron suboxide (BxO) of the present invention.

Further, the invention includes a lapping and polishing powder and lapping slurry wherein the powder is made from a dense, finely crystalline boron suboxide material with a Knoop hardness $KHN_{100}$ of at least about 2800 kg/mm$^2$ and preferably at least 3800 kg/mm$^2$.

7 Claims, 15 Drawing Sheets

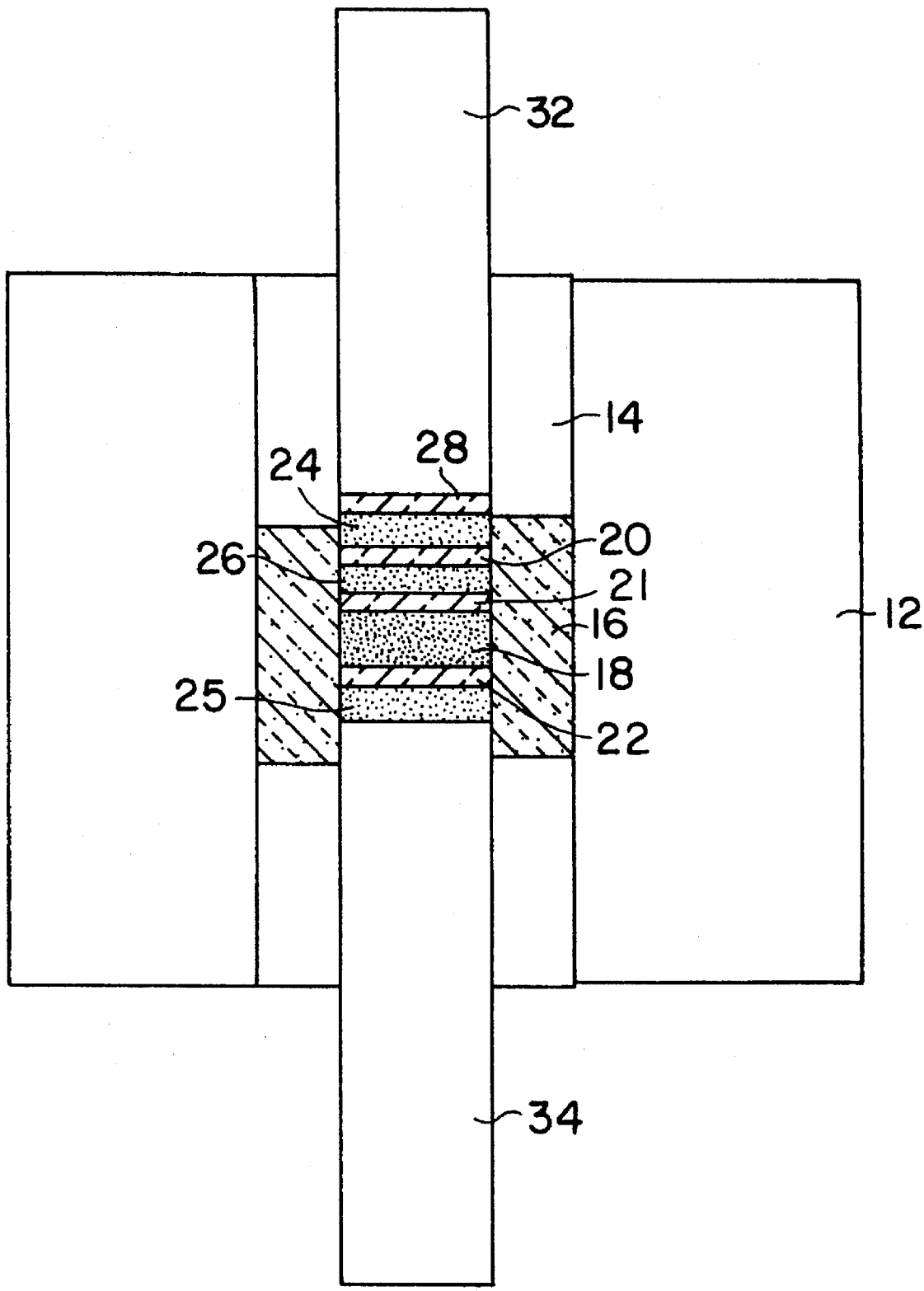
F I G. 1

NM086

1330X

NM138

1330X

NM176 1330X

NM3.99    1330X

METHOD OF ABRADING WITH BORON SUBOXIDE (BXO) AND THE BORON SUBOXIDE (BXO) ARTICLES AND COMPOSITION USED

CROSS-REFERENCE TO RELATED APPLICATIONS

This application is a continuation-in-part of application Ser. No. 08/051,114 filed Apr. 21, 1993 U.S. Pat. No. 5,366,526, which is a continuation-in-part of application Ser. No. 07/920,357 filed Jul. 28, 1992, U.S. Pat. No. 5,330,937, which is a continuation-in-part of application Ser. No. 07/729,467, filed Jul. 12, 1991, now U.S. Pat. No. 5,135,892 all of which are hereby incorporated by reference.

BACKGROUND OF THE INVENTION

1. Field of the Invention

The invention relates to a method of removing material from a surface using an abrasive tool or powder comprising a boron suboxide (BxO) composition. The invention further includes the boron suboxide (BxO) composition and articles made from the boron suboxide (BxO) composition used in lapping and polishing, honing, bonded abrasives, coated abrasives, wire sawing, abrasive flow machining, abrasive jet machining, abrasive waterjet machining and fixed abrasive lapping. The invention further relates to a novel boron suboxide (BxO) material and to a method for its preparation.

2. Technology Review

A great deal of research has been devoted to developing synthetic superhard materials which have hardness values approaching that of diamond. The best known of these synthetic superhard materials is cubic boron nitride (CBN). Other very hard binary and ternary compounds made from light elements such as boron, nitrogen, oxygen, aluminum, silicon and phosphorous may exist. Among these, the compounds $C_3N_4$, BNC, BPN, $B_4C$ and BP may be mentioned. Another of these compounds which has been reported as having high hardness values is boron suboxide (BxO).

Boron normally has a valence of 3 and reacts with oxygen to form boron oxide having the stoichiometric formula $B_2O_3$. Under suitable conditions, boron may react with oxygen and form compounds in which boron exhibits a valence less than 3. Powders of nominal composition $B_3O$, $B_4O$, $B_6O$, $B_7O$, $B_8O$, $B_{12}O$, $B_{13}O$, and $B_{18}O$ have been reported as being formed by reacting elemental boron (B) with boron oxide ($B_2O_3$) under suitably high pressure and temperature conditions. For purposes of this disclosure, the term "boron suboxide (BxO)" refers to boron/oxygen binary compounds wherein boron has a valence less than 3. Since different varieties of boron suboxide have been reported by others, boron suboxide (BxO) will be generally designated with the chemical formula $B_xO$.

The formation of boron suboxide (BxO) and a description of its properties have been extensively reported in the literature. Most of the reports in the literature attribute the formula $B_6O$ or $B_7O$ to the boron suboxide (BxO) being investigated. In some cases, the boron suboxide (BxO) formed and the material being investigated may consist of more than one phase. In U.S. Pat. No. 3,660,031, a method of preparing a boron suboxide material is disclosed. According to this patent, the boron suboxide material is formed by reducing zinc oxide with elemental boron at a temperature in the range of 1200–1500° C. The boron suboxide (BxO) produced by this method is reported as having the formula $B_7O$. It is also characterized as having an average hardness value as measured with a Vickers indentor under a 100 gram load ($VHN_{100}$) of 3,820 kg/mm$^2$ and a density of 2.60 grams/cc. The material is described as highly refractory, and suitable for use on surfaces subject to abrasion, e.g., grinding wheels, drill bits, machine tools, etc., and in structures employed in high temperature applications.

In U.S. Pat. No. 3,816,586, a method of fabricating boron suboxide products is disclosed. According to this patent, a mixture of elemental boron and boron oxide is cold pressed in a tantalum lined metal die. After the pressure on the compacted mixture is released, it is coated with a mixture of boron nitride and boron oxide, and is subjected to a second pressing step while heating at a temperature sufficient to melt the boron oxide in the compacted mixture. This is followed by a cooling step and another hot pressing step. The boron suboxide product made by this method is reported as being a smooth, sound boron suboxide article, free of flaws and contaminants, and suitable for a variety of applications. Upon analysis, the boron suboxide product gave 80.1 wt % boron and 19.9 wt % oxygen which corresponds to the stoichiometry of $B_6O$. It was also reported as having a density of 2.60 grams/cc and a Knoop hardness under a 100 gram load ($KHN_{100}$) of 3000 kg/mm$^2$.

Other reports on methods of preparing boron suboxide and the properties of this material are the following:

1. R.R. Pasternak, "Crystallographic Evidence for the Existence of $B_7O$:, Acta Cryst. 12 (1959), 612;
2. S. LaPlaca and B. Post, "The Boron Carbide Structure Type" Planseeberichte Fur Pulvermetallurgie, Bd. 9, 1961;
3. H. F. Rizzo, W. C. Simmons, and H. O. Bielstein, "The Existence and Formation of the Solid $B_6O$" Journal of the Electrochemical Society, Jan. 1963;
4. F. A. Halden and R. Sedlacek, "Growth and Evaluation of Boron Suboxide and Zirconium Dioxide Single Crystals" Stanford Research Institute, Nenlo Park, Ca., January 1963;
5. H. Tracy Hall and Lane A. Compton, "Group IV Analogs and High Pressure, High Temperature Synthesis of $B_2O$" Inorg Chem. 4 (1965) 1213;
6. W. C. Simmons, "Progress and Planning Report on Boron Suboxide $B_6O$" Air Force Materials Laboratory, March, 1968;
7. H. Wrerheit, P. Runow, and H. G. Leis, "On Boron-Suboxide Surface Layers and Surface States of B-Rhombohedral Boron", Phys. Stat. Sol. (a) 2, K125 (1970);
8. E. V. Zubova and K. P. Burdina, "Synthesis of $B_6O$ Under Pressure", Dokl. Akad. Nauk. SSR, 197 (5) (1971) 1055–1056;
9. C. E. Holcombe, Jr., and O. J. Horne, Jr., "Preparation of Boron Suboxide, $B_6O$" Journal of the American Ceramic Society—Discussions and Notes, Vol. 55, No. 2 (1971) 106;
10. D. R. Petrak, R. Ruh, and B. F. Goosey, "Preparation and Characterization of Boron Suboxide", National Bureau of Standards Special Publication 364, Solid State Chemistry, Proceedings of 5th Materials Research Symposiums, issued July 1972;
11. W. H. Rhodes and A. J. DeLai, "research on Development and Fabrication of Boron Suboxide Specimens" AVCO Corp , prepared for: Air Force Materials Laboratory, August, 1972;

12. R.R. Petrak, R. Ruh, and G. R. Atkins, "Mechanical Properties of Hot-Pressed Boron Suboxide and Boron" Ceramic Bulletin, Vol 53, No 8 (1974), 569–573;

13. P. M. Bills and D. Lewis, "Non-stoichiometry of Boron Suboxide ($B_6O$)" Journal of the less Common Metals, 45 (1976) 343–345;

14. V. S. Makarov and Ya. A Ugai, "Thermochemical Study of Boron Suboxide $B_6O$" Journal of the Less Common Metals, 117 (1986), 277–281;

15. C. Brodhag and F. Thevenot, "Hot Pressing of Boron Suboxide $B_{12}O_2$" Journal of the Less Common Metals, 117 (1986), 1–6;

16. Tadashi Endo, Tsugio Sato, Masahiko Shimada, "High-pressure Synthesis of $B_2O$ with Diamond-like Structure", Journal of Material Science Letters 6 (1987), 683–685;

17. D. Emin, "Icosahedra Boron-Rich Solids" Physics, Today, January, 1987.

18. A. Badzian, "Superhard Material Comparable in Hardness to Diamond" Appl Phys Lett 53(25) 19 December 1988;

19. W. E. Moddeman, A. R. Burke, W. C. Bowling and D. S. Foose "Surface Oxides of Boron and $B_{12}O_2$ as Determined by XPS" Surface and Interface Analysis, Vol. 14 n5, May, 1989, 224–232.

All of the aforementioned patents and publications are hereby incorporated by reference.

These publications and patents are in agreement that boron suboxide compounds can be produced according to the following chemical equation:

$$(3x-2)B + B_2O_3 \rightarrow B_xO \quad (1)$$

at moderately high pressures (e.g., 1,000 to 6,000 psi) and moderately high temperatures (e.g., 1400° to 2200° C.). The specific form of $B_xO$ actually produced depends on the process conditions and the ratio of elemental boron to boron oxide loaded into the reaction cell. Alternatively, boron suboxide compounds may be produced according to the following chemical equation:

$$B + MO \rightarrow B_xO + M \quad (2)$$

wherein M=Mg or Zn, at temperatures ranging from 1200° C. to 1500° C. without applied pressure. Depending on the starting proportions of boron and metal oxide, the formula $B_6O$ has been attributed most frequently to the boron suboxide compound formed, although some researchers report the formation of $B_7O$ and other boron/oxygen compounds.

Generally, the hardness and density values reported for boron suboxide in all of the aforementioned publications have been in good agreement. Average $KHN_{100}$ values of 3400 to 3600 kg/mm² were reported by Simmons, and $KHN_{100}$ values of 3400 to 3500 kg/mm² were reported by Petrak et al. The $KHN_{100}$ value reported in U.S. Pat. No. 3,816,586 is somewhat anomalous and this may be due to the presence of another phase in addition to $B_6O$. In any event, none of the researchers have reported a $KHN_{100}$ greater than 3600 kg/mm² for boron suboxide. The densities reported by these researchers have been from 99.5 to 100% of the theoretical value. Furthermore, based on crystallographic data, most of the researchers have ascribed a rhombohedral unit cell to the boron suboxide that was produced.

Recent crystallographic studies of $B_6O$ and $B_7O$ have revealed that both possess the same crystal structure. This indicates these are the same defect phase and include all intermediate compositions.

Grinding, lapping, polishing and cutting is carried out on materials such as metals, ceramics, glass, plastic, wood and the like, using bonded abrasives such as grinding wheels, coated abrasives, loose abrasives and abrasive cutting tools. Abrasive grains, the cutting tools of the abrasive process, are naturally occurring or synthetic materials which are generally much harder than the materials which they cut. The most commonly used abrasives in bonded, coated and loose abrasive applications are garnet, alpha alumina, silicon carbide, boron carbide, cubic boron nitride, and diamond. The relative hardness of the materials can be seen from the following table:

| Material | $KHN_{100}$ Hardness |
| --- | --- |
| garnet | 1360 |
| α-alumina | 2100 |
| silicon carbide | 2480 |
| boron carbide | 2750 |
| cubic boron nitride | 4500 |
| diamond (monocrystalline) | 7000 |

The choice of abrasive is normally dictated by economics, finish desired, and the material being abraded. The abrasive list above is in order of increasing hardness but it is also coincidentally in order of increasing cost with garnet being the least expensive abrasive and diamond the most expensive.

Generally, a soft abrasive is selected to abrade a soft material and a hard abrasive to abrade harder types of materials in view of the cost of the various abrasive materials. There are, of course, exceptions such as very gummy materials where the harder materials actually cut more efficiently. Furthermore, the harder the abrasive grain the more material it will remove per unit volume or weight of abrasive. Superabrasive materials include diamond and cubic boron nitride, diamond is the hardest known material, and cubic boron nitride is the second hardest. One skilled in abrasive technology would expect an abrasive material with similar properties to perform consistently in relation to other materials in a variety of applications (e.g., diamond and cubic boron nitride perform similarly relative to each other in grinding, lapping and cutting applications).

We have found no indication in the literature that boron suboxide (BxO) has been used in the abrasives field. Boron suboxide (BxO), however, if used would be expected to perform as an abrasive in a manner relative to the hardness used. With no researcher(s) having reported a $KHN_{100}$ greater than 3600 kg/mm² for boron suboxide, the boron suboxides (BxO) with hardnesses less than 3600 kg/m² would have been expected to have abrasive properties similar to those of other abrasives with similar hardnesses. Furthermore, boron suboxide (BxO) would have been expected to perform, relatively the same in all bonded, coated, cutting and loose abrasive applications.

Conventionally, boron suboxides because of their lower hardness were not considered for abrasive applications. While many compounds in the boron suboxide family (BxO) are known, what is unknown is the use of boron suboxide (BxO) in articles manufactured at temperatures below which boron suboxide degrades, boron suboxide (BxO) abrasive applications performed at temperatures below which boron suboxide (BxO) degrades, and the superior unexpected results achieved in these applications.

Further, while the reported hardness values of boron suboxide (BxO) are quite good, it would be desirable to produce a superhard form of boron suboxide (BxO) having a hardness value which more closely approaches that of diamond which ranges from $KHN_{100}$ of 6000 to 9000 kg/mm². More particularly, because the raw materials which form boron suboxide are inexpensive and the process is relatively simple, it would be desirable to produce a superhard form of boron suboxide which has an average $KHN_{100}$ hardness value of at least about 3800 kg/mm², and preferably in the range of about 4000–4500 kg/mm².

SUMMARY OF THE INVENTION

The invention is a method of removing material from a surface comprising the step of abrading a surface with an abrasive tool or powder comprising a boron suboxide (BxO) abrasive composition wherein during the abrading step degradation of the boron suboxide abrasive composition is minimized. The abrasive which is from the boron suboxide (BxO) family of compounds exhibits an unexpectedly high quality of abrading comparable with the highest quality particulate natural and synthetic diamond, which has a hardness about double that of the boron suboxide.

Further, the invention includes the use of the boron suboxide (BxO) compositions in a fluid vehicle, the boron suboxide (BxO) composition containing abrading slurry, articles of bonded boron suboxide (BxO) bonded at low temperatures, articles of coated boron suboxide (BxO), boron suboxide (BxO) abrasive cutting tools manufactured at low temperatures and the boron suboxide (BxO) compositions used in this abrading method.

The boron suboxide (BxO) used in these applications can either be produced by methods known in the art, or for the preferable higher hardnesses, a new boron suboxide ($B_xO$) material is provided which comprises at least 95% by weight of $B_6$ and has an average $KHN_{100}$ hardness value of at least about 3800 kg/mm². Preferably, the new boron suboxide material has an average $KHN_{100}$ hardness value above about 4000 kg/mm², typically about 4250 kg/mm², which is well beyond the average hardness values previously reported for any form of boron suboxide.

According to the invention, the novel form of boron suboxide is produced by reacting stoichiometric amounts of elemental boron and boron oxide in accordance with the chemical equation:

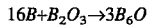

(3)

under carefully controlled conditions. The reaction is carried out in a specially designed cell at a temperature of about 1900° C. to about 2100° C., and at a pressure in the range of about 3,000 to about 4,000 psi, for a sufficient time to produce a form of boron suboxide which is at least 95% by weight $B_6O$ and has an average $KHN_{100}$ hardness value of at least about 3800 kg/mm². Furthermore, while the $B_2O_3$ starting material in the above chemical equation is assumed to be essentially pure (e.g., about 99.9% pure), surprisingly it has been found that if the elemental boron used as a starting material is less than about 95% pure a $B_6O$ material which is harder than previously reported in the literature can be formed. It was found that the impure B contained about 6% Mg. It is believed that the Mg aids the sintering of the boron suboxide, so that an improved form of $B_6O$ is produced which has greater hardness. The quantity of boron used is that suggested by equation 3 and was not adjusted to compensate for its lack of purity. Transmission electron microscopic examination of this harder material reveals a more defect-free structure than previously reported forms of $B_6O$. An alternate method of producing $B_6O$ of high hardness is to use pure raw materials and separately add a suitable quantity of the desired sintering aid. Other materials such as Ca and Y are also expected to act as sintering aids.

In a further alternate method of producing superhard $B_6O$, it is possible to mix substantially pure $B_2O_3$ with substantially pure B without the inclusion of any sintering aid. It should be understood that an outer layer of boron oxide may form on the surface of the boron particles. When used in the context of this alternative method of producing superhard boron suboxide, the terms "substantially pure" and "essentially pure" boron disregard this oxide layer and are meant to convey that no sintering aid is present. In accordance with this alternate method, the boron particles are extremely small (average particle size of less than 1 micron) and an excess of boron powder is mixed with the boron oxide in order to compensate for the extra oxygen which is present in the oxide layer. The superhard BxO made by this method is homogeneous and has an average grain size of about 1–5 microns in comparison to an average grain size of 18–40 microns if made by the other methods described above. Material having an average grain size of less than 5 microns will be referred to herein as "fine grain" form of boron suboxide, while the material having an average grain size of 18–40 microns will be referred to herein as "large grain" boron suboxide.

BRIEF DESCRIPTION OF THE DRAWING

FIG. 1 illustrates the specially designed cell which is used to produce the novel form of boron suboxide.

DETAILED DESCRIPTION OF THE INVENTION

Figure 2:
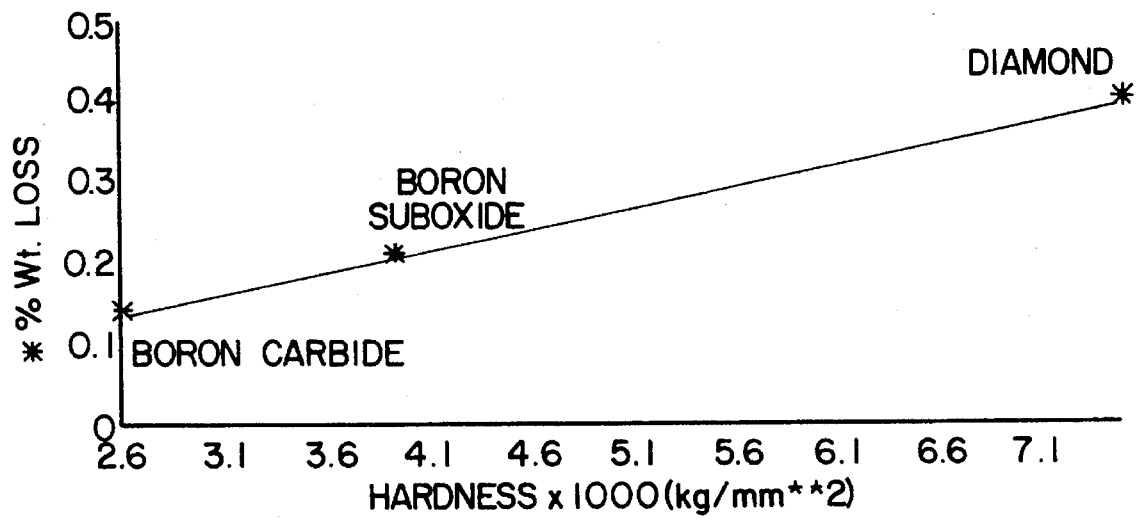
FIG. 2 graphically shows the predicted or theoretical lapping performance on 4140 steel of the invention BxO, diamond, and boron carbide abrasives, based on their Knoop hardnesses ($KHN_{100}$).
Figure 3:
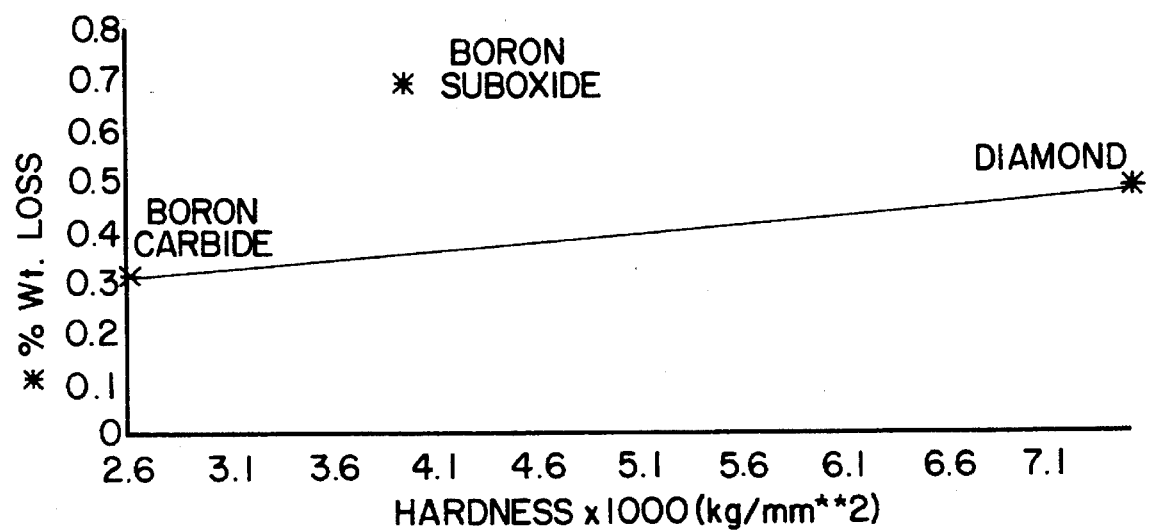
FIG. 3 graphically shows the actual lapping results of BxO, diamond, and boron carbide, lapping 4140 steel.

The method of removing material from a surface comprising the step of abrading a surface with an abrasive tool or powder comprising a boron suboxide (BxO) abrasive mixture wherein during the abrading step degradation of the boron suboxide (BxO) abrasive composition is minimized can be achieved by processes which are known in the art. These processes or methods of abrading a surface include for example loose abrasive lapping and polishing; fixed-abrasive lapping and polishing; honing and superfinishing; wire sawing; abrasive flow machining; ultrasonic machining; abrasive jet machining; abrasive waterjet machining; low temperature coated abrasive grinding and low temperature bonded abrasive grinding. These processes will be described later and can be run at low temperatures which allows for superior abrading results with boron suboxide (BxO). The examples are, however, given by way of illustration and not by way of limitation.

Boron normally has a valence of 3 and reacts with oxygen to form boron oxide having the stoichiometric formula $B_2O_3$. Under suitable conditions, boron may react with oxygen and form compounds in which boron exhibits a valence less than 3. These conditions may include variations in temperature and pressure as well as other processing conditions known in the art. For purposes of this application, the term "boron suboxide" is defined as boron/oxygen binary compounds wherein boron has a valence less than 3. Since different varieties of boron suboxide have been reported by others, boron suboxide will be generally designated with the chemical formula (BxO).

The boron suboxide (BxO) composition used in the boron suboxide (BxO) abrasive mixture of the present invention can be produced by hot-pressing, hot isostatic pressing, metal oxide derivation, boric acid derivation, chemical vapor deposition, sol-gel derivation, plasma jet derivation and any combinations of these and other processes known in the art. Each of these methods produce the boron suboxide (BxO) composition in various physical forms which may have to be further processed into a loose boron suboxide (BxO) abrasive powder to be used in the abrasive composition or mixture.

The preceding examples of methods, however, are only given by way of illustration and not by way of limitation.

The preferred method of producing the boron suboxide (BxO) composition is by hot-pressing. Further, the hot-pressed boron suboxide (BxO) composition is more preferably made according to the following process. The novel boron suboxide material of the present invention is made by hot pressing a stoichiometric mixture of elemental boron and boron oxide powders in a specially designed cell. Preferably, both the boron oxide ($B_2O_3$) powder and the elemental boron powder are of high purity (e.g., 99.9% pure).

The boron and boron oxide powders are mixed together in stoichiometric proportions according to equation (3). It is important that the two powders be mixed and milled very thoroughly to break up agglomerates and/or reduce the size of the larger particles. This may be accomplished for example by placing the mixture in a container with tungsten carbide balls or any other suitable media as a mixing aid and hexane or other non-oxygenated dispersion liquid (⅓ by volume) and tumbling for at least 8 hours to ensure intimate mixing and allow reduction in powder particle size or agglomerates. An alternate mixing method would be an attrition milling technique or any other mixing technique to achieve the same blend in a shorter time. This slurry should be dried to evaporate any remaining hexane without altering material composition. This is followed by screening to reduce large agglomerates.

A mixture of boron and boron oxide powders prepared in this manner can be converted into the novel boron suboxide material by hot pressing the mixture at temperatures in the range of about 1800°–2200° C. and at pressures of about 2,000–6,000 psi while encapsulated by hexagonal boron nitride or another suitable barrier material, such as tantalum. For this purpose, the specially designed cell shown in FIG. 1 may be used. The cell comprises a graphite mold having outer wall 12 and inner wall 14. A cylinder 16 made from hexagonal boron nitride forms a part of the inner wall 14. The boron/boron oxide mixture 18 is positioned in the graphite mold within the hexagonal boron nitride cylinder. The boron/boron oxide mixture is then sandwiched between hexagonal boron nitride plates 21,22. The hexagonal boron nitride plates 21,22 are set between layers 25,26 of hexagonal boron nitride powder. Another mass of hexagonal boron nitride powder 24 is confined between a second set of boron nitride plates 20,28. Graphite pistons 32,34 press against the hexagonal boron nitride powder 25 and the hexagonal boron nitride plate 28 thereby compressing the boron/boron oxide mixture while encapsulated with hexagonal boron nitride or other suitable barrier.

When the components are assembled and loaded with premixed powders as described above and subjected to pressures of about 2,000 to about 6,000 psi and temperatures of about 1500° C. to about 2200° C. for periods of about 5 minutes to 3 hours, the novel boron suboxide material is formed. For example, a 30 gram sample of stoichiometric boron (90–92% pure boron)/boron oxide is subjected to a pressure of 3,240 psi and a temperature of 1960° C. for about 3 hours to form boron suboxide which is at least about 95% by weight of $B_6O$ and has an average $KHN_{100}$ hardness value of at least about 3800 kg/mm$^2$ and more preferably about 4250 kg/mm$^2$.

Since the scatter of average $KHN_{100}$ values for a given material is no more than about 25–50 kg/m$^2$, and the average $KHN_{100}$ values of the thus produced boron suboxide material is at least about 200 kg/mm$^2$ and more typically about 650 kg/mm$^2$, greater than any previously reported value for a boron suboxide material, it is concluded that the material produced in accordance with the present invention is a new superhard form of boron suboxide. X-ray diffraction, electron microprobe analysis and transmission electron microscopy confirm that this new superhard form of boron suboxide comprises at least about 95% by weight of polycrystalline $B_6O$ and has a more perfect crystal structure with fewer defects than softer forms of boron suboxide also examined. This method of producing boron suboxide (BxO) by hot pressing is, however, given as an illustration and not as a limitation.

Boron suboxide made in this manner and having a $KHN_{100}$ hardness of at least about 3800 kg/mm$^2$ is in the form of a solid mass when it is removed from the cell. It can then be crushed into granules and sized by techniques well known to those skilled in the art. The powder can be used in low temperature applications as an abrasive grit, or the grit can be bonded to tools which require highly abrasive surfaces, for example, grinding wheels, drill bits, machining tools, etc. Other boron suboxides (BxO) which can be produced by the processes described above with $KHN_{100}$ hardnesses of less than 3800 kg/mm$^2$ are expected to produce superior results also in low temperature applications as an abrasive grit, or when bonded to tools which require highly abrasive surfaces, for example, grinding wheels, drill bits, machining tools, etc.

The bulk boron suboxide (BxO) which is in the form of an ingot or slug and which is crushed into the boron suboxide (BxO) powder of the invention has a Knoop hardness ($KHN_{100}$) of preferably greater than about 3000 kg/mm$^2$; still preferably greater than about 3100 kg/mm$^2$; still preferably greater than about 3200 kg/mm$^2$; still preferably greater than about 3300 kg/mm$^2$; still preferably greater than about 3400 kg/mm$^2$; still preferably greater than about 3500 kg/mm$^2$; still preferably greater than about 3600 kg/mm$^2$; more preferably greater than about 3700 kg/mm$^2$; and most preferably greater than about 3800 kg/mm$^2$.

The chemical composition of the boron suboxide (BxO) produced is preferably at least about 70% by weight of boron suboxide and as much as about 30% by weight of other materials such as boron, boron rich phases, or a sintering aid such as oxides of magnesium, beryllium, calcium, strontium, barium, yttrium or other Group II A elements, and more preferably at least about 95% by weight of boron suboxide (BxO) and as much as about 5% by weight of other materials such as boron, boron rich phases, or a sintering aid such as oxides of magnesium, beryllium, calcium, strontium, barium, yttrium or other Group II A elements.

The comminuted granules or particles of the boron suboxide (BxO) composition are each made up of a number of very fine grains or crystallites ranging in size preferably from about 0.001 microns to about 150 microns, more preferably from about 0.01 microns to about 60 microns, and most preferably from about 0.05 microns to about 40 microns. If the granules or particles of the basic boron suboxide (BxO) composition are comminuted to for example particles 40 microns or smaller then obviously each particle may be made up of a single grain or pieces of a single grain.

Because quality abrading is particle size dependent, when the boron suboxide (BxO) is made by the preferred hot-pressing method, the coarsely crushed e.g. 18 mesh (U.S. Standard Sieve Series) (approx. 1000 micron) boron suboxide (BxO) material must be subjected to further processing. The coarse boron suboxide (BxO) composition is preferably processed by being placed in a mill with grinding media and milled dry for a time period sufficient to shape and comminute the material. The powder is monitored for particle size distribution by way of image analysis as well as microscopic inspection before milling and during the milling process. The resulting comminuted fine powder is screened through a 3 mesh screen (U.S. Standard Sieve Series) to separate the stainless steel milling media. The separated boron suboxide (BxO) composition is washed with 13 N HCl to remove any iron, chromium and nickel contamination which resulted from milling in the stainless steel milling equipment. Typically this step is carried out in a polymer container, with the mixture of boron suboxide (BxO) powder and Hcl solution preferably being stirred for 10 or 15 minutes. When no further turbulence occurs then the slurry is heated to about 180° F. (82.2° C.) and maintained at that temperature for several hours; the liquid is removed and the washing step with HCl is repeated to ensure complete removal of all metal contamination. The purified fine powder is then elutriated to separate the material into several fractions having different particle size ranges, e.g. 5 to 7 microns, 3 to 5 microns, and 1 to 3 microns. As mentioned earlier, these are the preferred methods of processing and further refining the boron suboxide (BxO). This example is not, however, the only method of processing the boron suboxide (BxO) composition, and should be considered as an illustration rather than a limitation.

The boron suboxide (BxO) composition in loose powder form preferably has an average particle size between from about 0.005 microns to about 500 microns, more preferably an average particle size between from about 0.05 microns to about 200 microns, and most preferably between from about 0.1 microns to about 60 microns.

The boron suboxide (BxO) composition can be combined with other abrasives to form abrasive mixtures. The abrasive mixture used as a lapping powder may include the boron suboxide composition alone or the boron suboxide (BxO) composition in combination with at least one other abrasive for example such as fused aluminum oxide, seeded aluminum oxide, sintered aluminum oxide, silicon carbide, boron carbide, silicon nitride, cubic boron nitride, mono and polycrystalline diamond, zirconium oxide, metal carbides and the like, including combinations of one or more of these abrasive materials with the boron suboxide. In addition, other grindings aids can be added such as lubricants. The boron suboxide (BxO) composition preferably forms from about 5 to about 100 wt % of the boron suboxide (BxO) abrasive mixture, preferably from about 10 to about 90 wt % of the abrasive mixture, more preferably from about 20 to about 80 wt % of the abrasive mixture, and most preferably from about 20 to about 60 wt % of the abrasive mixture. These abrasive mixtures can be used in forming an abrasive tool or in loose abrasive powder applications.

The surface which is abraded is for example a metal, glass, ceramic, polymer, wood or any combination of these or other surfaces known to those skilled in the art. These examples are, however, given as an illustration rather than a limitation.

The term abrasive tool is meant to define any device designed for abrading. Examples of abrasive tools include grinding wheels, cutting wheels, coated abrasives, wire saws, and honing sticks. These examples are, however, given as an illustration rather than a limitation.

The manufacture of some bonded abrasive tools require that the abrasive be subjected to high temperatures in the manufacturing process such as, for example, the manufacture of vitrified bonded grinding wheels. Further, the use of bonded and coated abrasives at higher speeds generally increase temperatures during grinding to well above room temperature, and in the case of high speed grinding of metals the contact temperature between the metal and the abrasive can be at or near the melting point of the metal. Boron suboxide (BxO), boron suboxide (BxO) compositions and boron suboxide (BxO) mixtures are found to degrade at elevated temperatures. Degradation for the purpose of this application is defined as the change in chemical and physical properties of the boron suboxide. Various factors influence the degradation including the atmosphere surrounding boron suboxide (BxO). Therefore, abrasive articles manufactured with boron suboxide (BxO) must be manufactured at temperatures below which the boron suboxide does not degrade or where the degradation is minimized or manufactured at higher temperatures while simultaneously controlling factors such as the atmosphere in order to prevent degradation of the boron suboxide (BxO). Common atmospheres which could potentially degrade boron suboxide (BxO) through oxidation are for example air, $O_2$ and oxygen containing bonds or media at elevated temperatures. These examples are, however, given as illustrations and not as limitations.

The boron suboxide can be used in applications whereby during the abrading step the boron suboxide (BxO) is maintained at a temperature at which degradation of the boron suboxide does not take place or is minimized over the life of the abrasive tool or powder. By minimized, it is meant that preferably at least 60% by weight of the boron suboxide (BxO) remains in the same chemical or physical form, more preferably at least 75% by weight of the boron suboxide (BxO) remains in the same chemical or physical form, and most preferably at least 90% by weight of the boron suboxide (BxO) remains in the same chemical or physical form over the life of the abrasive tool or powder. For example, the processes or methods of abrading a surface with boron suboxide (BxO) should include methods of abrading which do not oxidize the boron suboxide (BxO), or where the boron suboxide (BxO) oxidizes at a very low rate. While these processes may not result in superior abrading results using boron suboxide (BxO) under every processing parameter, the superior results will be achieved if the process is adjusted to prevent or minimize degradation of the boron suboxide (BxO). To prevent degradation of the boron suboxide (BxO) in an air atmosphere, preferably means keeping the temperature of the boron suboxide (BxO) in the tool or the powder during abrading below 600° C., more preferably below 550° C., and most preferably below 500° C.

The boron suboxide (BxO) composition can be coated with a barrier which prevents its degradation during the manufacture of abrasive tools with the boron suboxide (BxO). The barrier coating can be applied by various techniques known in the art including, for example, chemical vapor deposition and physical vapor deposition. These examples are given by way of illustration and not by way of limitation. The barrier coating can be any coating used by those skilled in the art to prevent degradation of the boron suboxide (BxO). Examples of these barrier coatings include SiC, diamond, metal-metal oxide mixtures, metals, $Si_3N_4$, and combinations thereof. Further, these examples of barrier coatings are given by way of illustration and not by way of limitation.

For example, in order to prevent degradation by oxidation a barrier coating must be applied which does not oxidize the boron suboxide (BxO) through oxygen in the coating while further preventing oxidation by diffusion of oxygen through the barrier coating of the boron suboxide (BxO) at high temperatures during manufacturing.

Lapping or polishing are two of the processes or methods of abrading a surface which gives superior results in abrading a surface. There are several methods of lapping which can be used which include but are not limited to single-side flat lapping, double-side flat lapping and cylindrical lapping between flat laps. There also are three common polishing processes known in the art: mechanical polishing, chemical polishing, electropolishing and a combination thereof. Materials can be either hand lapped or mechanically lapped.

Lapping and polishing with a boron suboxide (BxO) abrasive composition or mixture in the powder form preferably involves the use of equipment comprising a means for holding and/or guiding the work piece to be lapped or polished, and at least one lap plate. The loose boron suboxide (BxO) abrasive composition in the powder form is made into a slurry with a water, oil, water soluble oil, or a combination of organic compounds like ethylene glycol and butyl cellosolve, based liquid vehicle, and is continuously or intermittently applied between the workpiece and the lapping plate. Pressure is applied to the workpiece and lap plate and the latter is rotated. This technique produces only one precision flat side on a workpiece. When the part or workpiece must have two sides in perfect parallelism both sides of the workpiece are lapped simultaneously using a more complex machine made up of an upper and a lower lap plate, and special holders for the workpieces with abrasive slurry being fed between the upper lap plate and the upper surface of the workpiece, and between the lower lap plate and the lower surface of the workpiece. The holders for the workpiece are typically sprocket-type carriers which are flat relative to the lower lap and are rotated by a centrally located driving means. Still another lapping-polishing mode is the lapping or polishing of cylinder shaped workpieces which is usually done with flat lap plates.

While the major component in lapping is the abrasive, there generally must be a fluid vehicle, the composition of which can have a substantial effect on quality of the lapping process. The make-up of the fluid vehicle or compound vehicle portion of the lapping slurry is dictated to some degree by the abrasive, the lapping equipment, the lapping conditions, and the material being lapped. There is no universal fluid but most are composed of a certain group of basic materials. The main constituent of the fluid is water, water/water soluble oil, oil or polymers in which are dispersed, for example, viscosity enhancers, lubricants, wetting agents, anti-caking agents, anti-foam compounds, and bactericides, or other micro-organism controlling substances. Further, it should be noted that some vehicles can be used which only become fluid under lapping pressure. The abrasive and the fluid vehicle together are called the lapping slurry.

The abrasive mixture which is or includes boron suboxide (BxO) is added to the fluid in amounts varying preferably from about 0.1% to about 25% by weight of the entire slurry composition and most preferably from about 0.2% to about 10% by weight. As already pointed out, the precise make-up of the lapping slurry with respect to specific amounts of boron suboxide (BxO), specific materials used in the liquid vehicle and these relative amounts are basically dependent on the lapping conditions, the equipment being used, the material being lapped, and the desired results, all of which are well known to those skilled in the art. For example the preferred fluid used in the lapping slurry for a 310 Stainless Steel is composed of 25% polyalkylene glycol and 75% ethylene glycol ether by volume. The preferred carrier, however, would change depending on the material being lapped and other lapping conditions.

As mentioned earlier, the invention is based on the unexpected performance of boron suboxide (BxO) composition used as an abrasive tool or powder for abrading, wherein during abrading the boron suboxide (BxO) composition is maintained at low temperatures. Generally, one skilled in abrasive technology would expect an abrasive grit to perform consistently in relation to other grits based on mechanical properties, i.e., hardness, in a variety of applications (e.g., diamond and cubic boron nitride perform similarly relative to each other in both grinding and lapping applications). Boron suboxide (BxO) does not, however, behave consistently in this manner. Example 8 shows that boron suboxide (BxO) used in grinding wheel applications was inferior to seeded aluminum oxide, cubic boron nitride and diamond. Table IV shows the results of grinding tests comparing the grinding performance of boron suboxide (BxO), seeded aluminum oxide and cubic boron nitride on steel and tungsten carbide where during the abrading by grinding the boron suboxide (BxO) reached temperatures at which the boron suboxide (BxO) oxidized. The boron suboxide (BxO) performed inferior to seeded aluminum oxide and significantly inferior to cubic boron nitride. Table V shows the results of grinding tests comparing the grinding performance of boron suboxide (BxO) with diamond where again during the abrading the boron suboxide (BxO) reached temperatures at which the boron suboxide (BxO) oxidized. The boron suboxide (BxO) performed significantly inferior to the diamond. Additionally, boron suboxide (BxO) was tested in several saw blade applications. In all tests, the boron suboxide (BxO) performance was inferior to seeded aluminum oxide, cubic boron nitride and diamond. The boron suboxide (BxO) provided little to no cutting action while wearing readily.

In contrast, Examples 9 and 10 are comparative tests showing the unexpected lapping performance of the invention boron suboxide (BxO) as compared to boron carbide and diamond lapping abrasives on various materials. In the results shown in Example 9, the boron suboxide (BxO) performed surprising well in comparison with diamond powder. The material removal was based on the same abrasive concentrations, fluid vehicles, slurry application rates and lapping pressures per material. The amount of material removed from the surface of the samples being lapped with boron suboxide (BxO) was slightly lower, but similar to the amount of material being removed with diamond powder. The boron suboxide (BxO) surprisingly removed 75% of the amount of 4140 Steel, 88.2% of the amount of 12L14 Steel and 94.5% of the amount of 390 Aluminum removed by diamond powder over the same lapping area.

In Example 10, the test data clearly shows that the use of boron suboxide (BxO) is comparable to the use of monocrystalline diamond as a lapping abrasive in the amount of material removed. Again, the material removal was based on the same abrasive concentrations, fluid vehicles, slurry application rates and lapping pressures per material. The boron suboxide (BxO) surprisingly removed 22% more silicon carbide, 40% more glass and 74% more 4140 Steel than was removed by diamond powder over the same lapping area.

Figure 4:
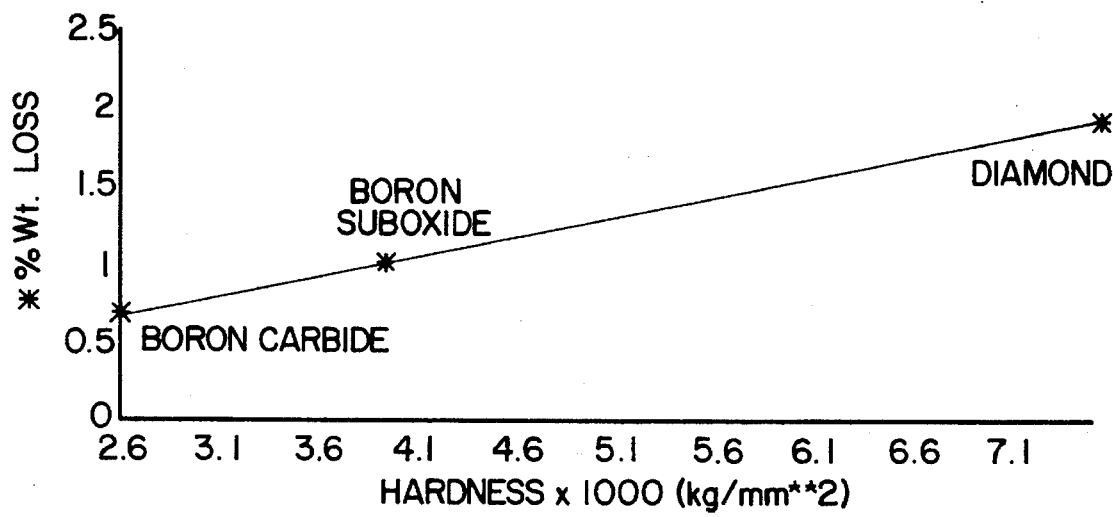
FIG. 4 graphically shows the theoretical lapping performance on silicon carbide of the BxO, diamond, and boron carbide, as a function of their Knoop hardnesses ($KHN_{100}$).
Figure 5:
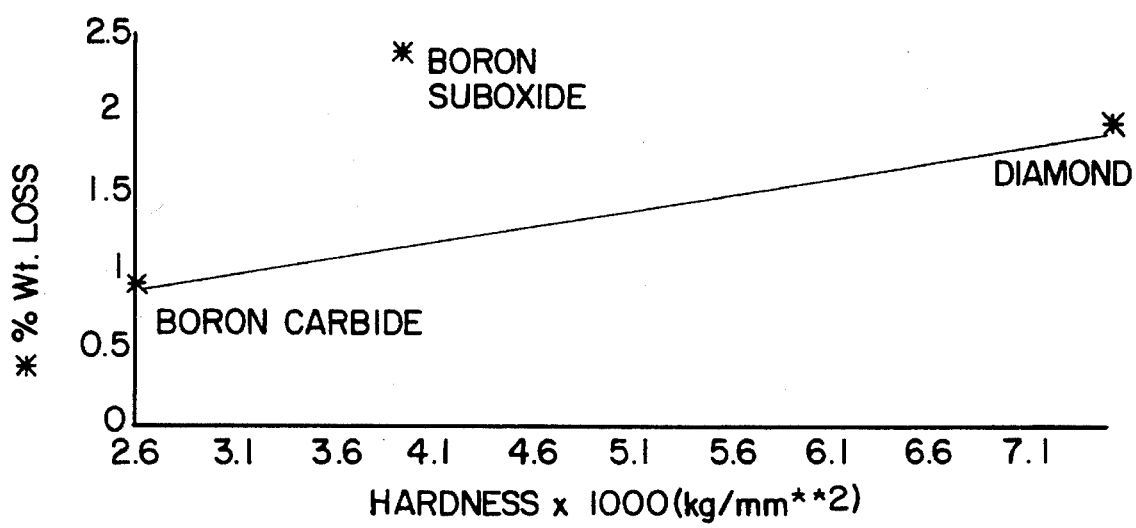
FIG. 5 graphically shows the actual lapping results of BxO, diamond, and boron carbide, lapping silicon carbide.
Figure 6:
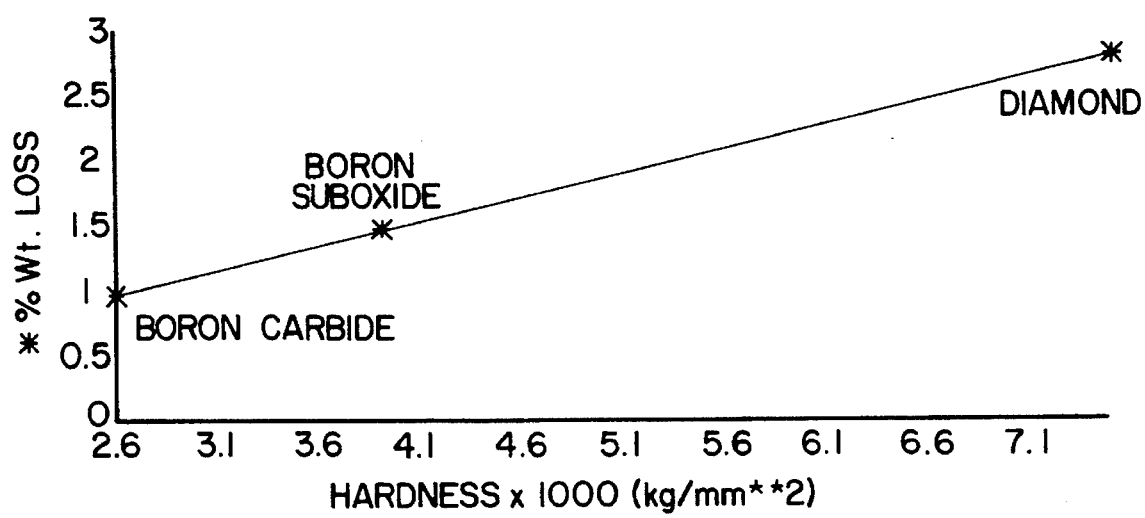
FIG. 6 graphically shows the theoretical lapping performance on glass of the BxO, diamond, and boron carbide, as a function of their Knoop hardnesses ($KHN_{100}$).
Figure 7:
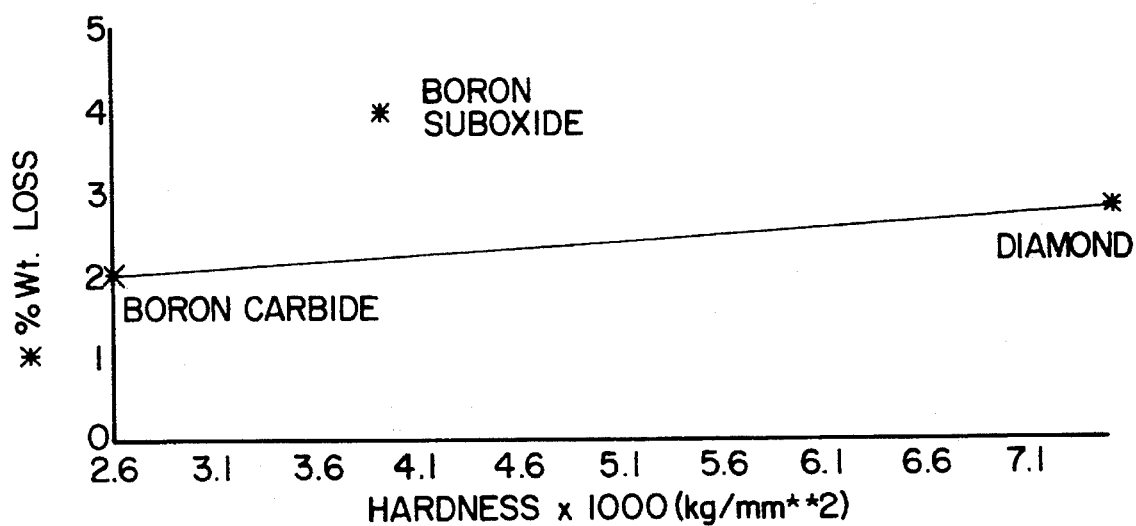
FIG. 7 graphically shows the actual lapping results of the BxO, diamond, and boron carbide, lapping glass.

The hardness of the bulk boron suboxide (BxO) ($KHN_{100}$ 3800 $kg/mm^2$) as compared to diamond ($KHN_{100}$ 7000 $kg/mm^2$) would predict that the boron suboxide (BxO) would perform only half as well as the diamond in terms of material removal. The excellent results of Examples 9 and 10 are shown in Tables VI and VII, and even more dramatically in FIGS. 2 through 7. FIGS. 2, 4, and 6, show the theoretical grinding performances of boron suboxide (BxO) in grinding 4140 steel, silicon carbide, and glass, respectively, based on what the material removal rate of boron suboxide (BxO) should be considering the Knoop hardness $KHN_{100}$ of the three materials. The predicted theoretical grinding performance of boron suboxide (BxO) is the expected grinding performance of boron suboxide (BxO) based on its Knoop hardness. The theoretical grinding performance is interpolated from a curve relating the theoretical grinding performance of both boron carbide and diamond to their relative hardness. In all cases the boron suboxide (BxO) had a predicted theoretical performance somewhat better than that of boron carbide but grossly inferior to the theoretical performance of the diamond abrasive powder. While the actual lapping performance is in reasonable agreement with respect to the predicted performance for the boron carbide and the diamond, the predicted versus the actual grinding results with respect to the boron suboxide (BxO) was surprising in that the boron suboxide (BxO) had unexpectedly similar results when compared to the diamond. These results are surprising in that the boron suboxide's (BxO) performance is surprisingly higher than the hardness of the three materials would suggest. These unexpected results are further supported in Example 11 where with a preferred carrier the boron suboxide (BxO) is capable of stock removal at over 15 times the rate of monocrystalline diamond.

Fixed abrasive lapping is another process or method of abrading a surface which gives superior results in abrading a surface. The fixed abrasive lapping is an efficient alternative compared to the loose abrasive lapping in obtaining the same desired dimensional accuracy and surface finish. In a fixed abrasive lapping/polishing operation, the abrasive particles such as boron suboxide grit are bonded (or embedded) in a bonding matrix with a portion of the abrasive grit protruding from the matrix. The exposed portion of abrasive grit acts as cutting point against the moving work piece(s) to remove material gradually and eventually achieve the desired goals. Since the abrasive grit is being held firmly in this manner, it does not roll away as freely as the loose particles. Therefore, it can be used and consumed more efficiently than the loose abrasive particles. This means lower cost per finished part.

Low pressure, low speed, and low power operation conditions reduce the likelihood of increased temperatures which can lead to the oxidation of the boron suboxide (BxO) in fixed abrasive lapping. Thus leading to superior results using boron suboxide compared to that of other conventional abrasives, and makings it a far superior lapping abrasive than conventional abrasives such as silicon carbide, boron carbide, etc. In addition as discussed earlier, the superior performance of boron suboxide when compared to diamond in lapping various work materials can also be expected in fixed abrasive lapping.

In a fixed lapping operation, the bond matrix systems for a fixed abrasive product can be either vitreous, metal alloys, or a resin/polymers. Care must be taken in manufacturing the fixed abrasive product to prevent oxidation of the boron suboxide (BxO). In vitreous bond systems, the bonding matrix will contain, but is not limited to, glass, glass softener, filler, and/or pore inducers. In metal bond systems, the bonding matrix contains, but is not limited to, soft metal alloys, particularly copper and/or silver based. In resin/polymer bond systems, the bonding matrix can be, but is not limited to, PVA, polyurethane, rubber, resins, vinyl film, mylar film, polyester, or other natural and synthetic polymers.

Honing/superfinishing is another process or method of abrading a surface which gives superior results in abrading a surface with boron suboxide (BxO) or combinations of (BxO) and other abrasives. Honing/superfinishing is a controlled, low-speed sizing and surface-finishing process in which stock is removed by the shearing action of the bonded abrasive grit of a honing stone, or stick. During honing/superfinishing the oxidation of boron suboxide (BxO) can be minimized or controlled.

Honing machines apply either one or several sticks mounted on the periphery of a cylindrical body to the work surface. During operation, the stone(s) have a simultaneous rotating and reciprocating action to remove work material thus achieving desired dimensional accuracy and surface finishing characteristics.

The honing stones (also known as honing sticks) may consist of particles of boron suboxide (either alone or mixed with other abrasive grits) bonded together by vitreous glass, resinoid, or metal. The particle size of abrasive grit is typically 500 microns or finer with an abrasive concentration ranging from 10% to 80% by volume. The glass bond systems contain mostly silica along with various glass softener(s) and/or other filler(s). The resinoid bond systems can be any natural or synthetic resins or polymers. The typical metal bond systems contain soft metal alloys such as, but are not limited to, copper based or silver based alloys.

Wire sawing is another process or method of abrading a surface which gives superior results in abrading a surface with boron suboxide (BxO). Wire sawing is a cutting/slicing process used in slicing thin wafers out of a bulk material. Wire may be pulled through a reservoir containing abrasive slurry where the abrasive particles form a coating on the wire. When the wire passes through the work materials, the abrasive particles abrade the workpiece and cut through it. This is a continuous process in which particle pick up and cutting take place simultaneously.

Under this cutting mechanism, the greater the difference in relative hardness between abrasive and work material, the faster the cut rate will be. Therefore, the boron suboxide (BxO) will offer superior performance in this application compared to silicon carbide and boron carbide.

Abrasive flow machining is another process or method of abrading a surface which gives superior results in abrading a surface. The abrasive flow machining (or known as extrusion hone) uses two opposed cylinders to extrude semisolid abrasive media back and forth through the passages formed by the workpiece and the tooling. By repeatedly extruding the media from one cylinder to the other, an abrasive action is produced as the media enters the restrictive passage and travels through or across the workpiece. The machining action is similar to a grinding or lapping operation in that the abrasive media gently polish the surfaces or edges.

The process is abrasive only in the extrusion area, where the flow is restricted. When forced into a restricted passage the polymer carrier in the media temporarily increases in viscosity; this holds the abrasive grains rigidly in place. They abrade the passages only when the carrier is in the more viscous state. The viscosity returns to normal as the abrasive slurry or media exits the restrictive passage.

Abrasive flow machining can process many inaccessible passages on a workpiece simultaneously, and handle multiple parts at the same time. It is used to deburr, polish, or impart a radius upon surfaces or edges.

The abrasive media consist of a pliable polymer carrier and a concentration of abrasive grains. The carrier is a mixture of a rubberlike polymer and a lubricating fluid. By varying the ratio of the two components, the viscosity of carrier can be modified continuously. Abrasive grains are either boron suboxide (BxO) alone or a mixture of boron suboxide (BxO) and other abrasive materials such as silicon carbide, aluminum oxide, or boron carbide, etc. The typical abrasive particle size range is 10 microns and finer. The superior hardness of boron suboxide will greatly enhance the workpiece material removal rate and increases the range of workpiece materials that can be machined by this process.

Ultrasonic machining is another process or method of abrading a surface which gives superior results in abrading a surface with boron suboxide (BxO). Ultrasonic machining is a process that utilizes ultrasonic (approx. 20 Khz) vibration of a tool in machining of hard, brittle, nonmetallic materials. This process consists of two methods: 1) ultrasonic impact grinding, and 2) rotary ultrasonic machining.

In ultrasonic impact grinding, an abrasive slurry flows through a gap between the workpiece and the vibrating tool. Material removal occurs when the abrasive particles, suspended in the slurry, are struck on the downstroke of the vibrating tool. The velocity imparted to the abrasive particles causes microchipping and erosion as the particles impinge on the workpiece. The process forms a cavity in the shape of the tool. The abrasive slurry typically consists of approximately 50% water and 50% abrasive particles by volume. The abrasive is either purely boron suboxide (BxO) or a mixture of boron suboxide (BxO) and other abrasive materials. The typical particle size is 75 microns or finer.

The rotary ultrasonic machining is similar to the conventional drilling of glass and ceramic with diamond core drills, except that the rotating core drill is vibrated at an ultrasonic frequency of 20 Khz or so. The tools are made by plating or brazing abrasive particles of boron suboxide to a tool form. As the tool contacts and cuts the workpiece, a liquid coolant, usually water, is forced through the bore of the tube to cool and flush away the removed material.

One advantage of using boron suboxide (BxO) in this process is that the superior hardness of boron suboxide will greatly enhance the workpiece material removal rate, as compared to the silicon carbide, boron carbide, and aluminum oxide. This superior hardness also increases the useful range of workpiece materials that can be machined by this process.

Abrasive water jet machining is another process or method of abrading a surface which gives superior results in abrading a surface with boron suboxide (BxO). Abrasive jet machining is a process that removes material from a workpiece through the use of abrasive particles entrained in a high velocity gas stream. This process removes material by the impingement of abrasive particles on the work surface. It differs from conventional sandblasting by using smaller-diameter abrasives and a more finely controlled delivery system. It is typically used to cut, clean, peen, deburr, deflash, or etch glass, ceramics, stones, or hard metals. The abrasive can be boron suboxide (BxO) particles alone or a mixture of boron suboxide (BxO) and other abrasive material(s). Grit size is typically 75 microns or smaller. Boron suboxide's superior hardness, compared to any other abrasive used in the field, will improve productivity through enhanced material removal rate.

Abrasive jet machining is another process or method of abrading a surface which gives superior results in abrading a surface. Abrasive waterjet machining is a process that uses an abrasive waterjet as a cutting tool. The incorporation of abrasive particles in waterjet stream greatly enhances the range of work materials that can be cut by this process. Superhard boron suboxide particles can further enhance the cut rate and make it capable of cutting even harder materials.

In order that persons in the art may better understand the practice of the present invention, the following Examples are provided by way of illustration, and not by way of limitation. Additional background information known in the art may be found in the references and patents cited herein, which are hereby incorporated by reference.

EXAMPLES

Example 1

A 20 g sample of boron/boron oxide powder was placed in a container containing tungsten carbide balls and hexane liquid (⅓ by volume). The 20 g sample consisted of 14.2 g of elemental boron and 5.8 g of boron oxide ($B_2O_3$). This roughly corresponds to a boron to oxygen ratio of 6:1. The boron oxide powder was 99.99% pure, while the boron powder comprised 91.03% by weight boron, 5.76% by weight magnesium, and 2.81% by weight oxygen, the balance being trace other elements.

The powder mixture was tumbled overnight, placed in drying trays, and then baked at about 100° C. to produce a dry, thoroughly mixed sample. Twenty grams of this sample was placed in a cell similar to that illustrated in FIG. 1 and was heated at 2000° C. under a pressure of 3650 psi for about three hours to produce the new form of boron suboxide.

The boron suboxide material was in solid form as it was removed from the cell. The boron suboxide produced in this manner was given the designation NM086.

Figure 8:
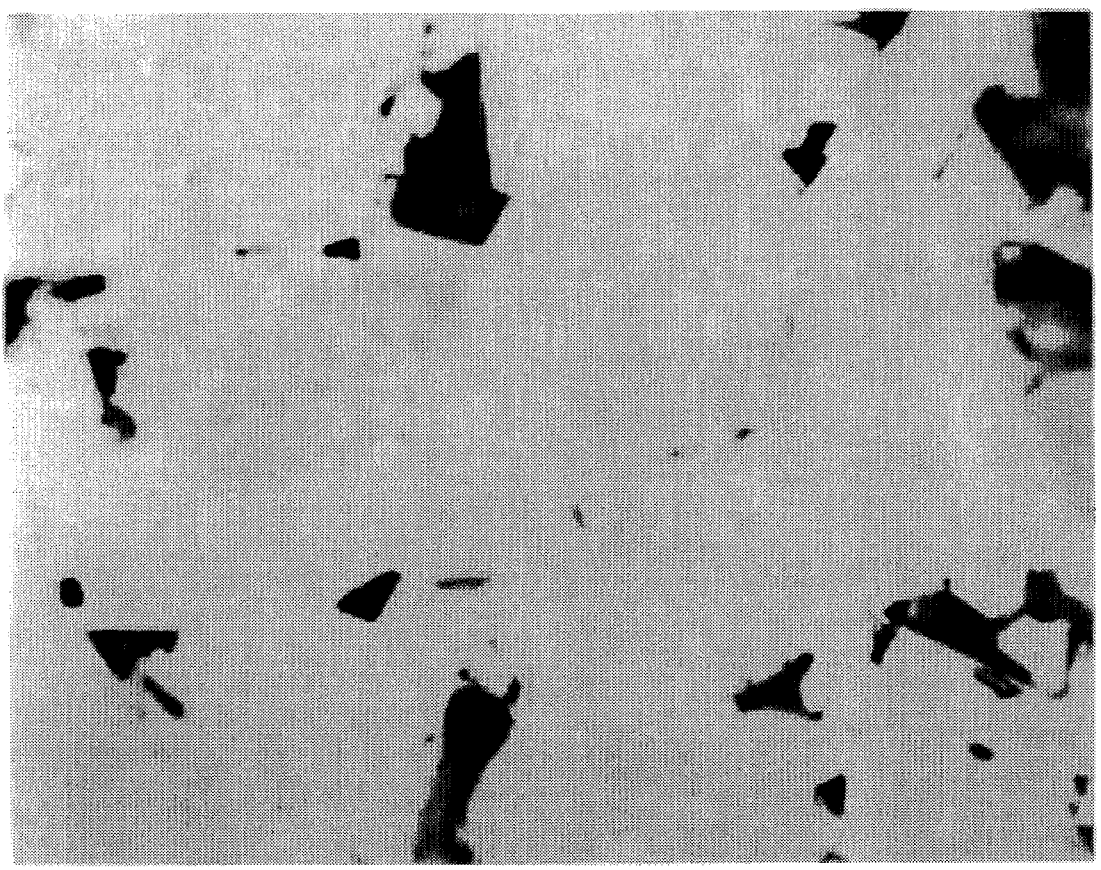
FIG. 8 is a photomicrograph of a sample of the new superhard form of boron suboxide made with magnesium sintering aid at a magnification of 1330X.

The NM086 sample was tested for hardness with a Knoop indentor and was found to have an average $KHN_{100}$ hardness value of 3790 kg/mm$^2$. The NM086 sample was also visually inspected under an optical microscope at a magnification of 1330X. FIG. 8 is a reproduction of the image seen through the microscope. It shows light gray areas containing primarily $B_6O$ and less than 5% Mg and W, dark gray areas containing approximately 10% B, 55% O and 35% Mg, and white areas containing approximately 95–96% B, 1–2% W, and 2–3% Mg.

Figure 9:
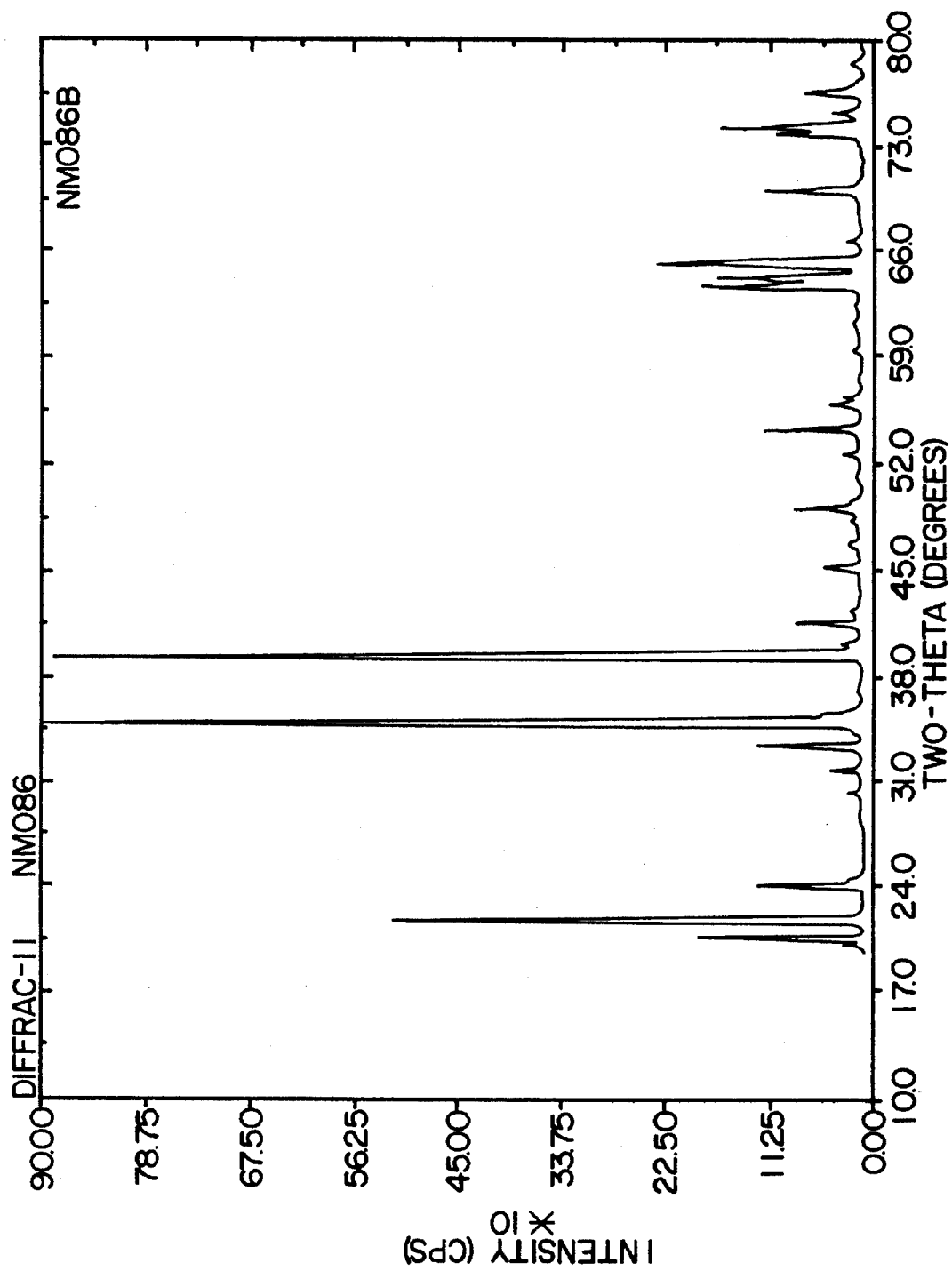
FIG. 9 is a plot of the X-ray diffraction pattern obtained with copper K-alpha radiation of the sample shown in FIG. 8.

A sample of NM086 was also subjected to X-ray diffraction analysis. FIG. 9 shows the results that were obtained. The sharpness and position of the peaks demonstrates that the NM086 sample consisted of a crystalline product with lattice constants of a=5.38435A±0.00051A and c=12.3175A±0.0062A when indexed as a hexagonal unit cell. Transmission election microscopy (TEM) photographs and electron diffraction patterns of the NM086 confirmed the presence of fewer faults in this sample than found in softer samples of $B_6O$.

It was concluded that NM086 was a new superhard form of boron suboxide which was much harder than any previously known form of boron suboxide, and which consisted primarily of polycrystalline $B_6O$ with relatively few defects or dislocations in the material.

EXAMPLE 2

The conditions of Example 1 were repeated except that this time the boron/boron oxide sample weighed 18.5g and was subjected to a temperature of 1960° C. at a pressure of 3241 psi for about three hours. The sample was given the designation NM138 and was tested as in Example 1.

Figure 10:
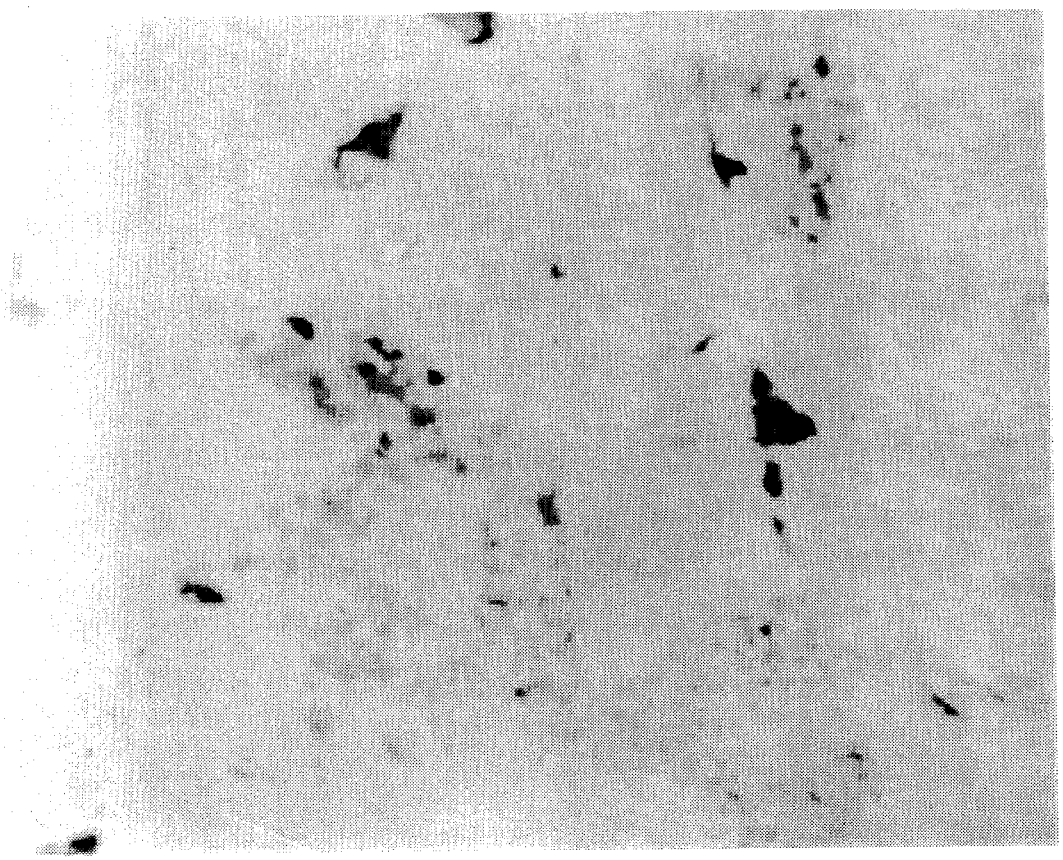
FIG. 10 is a photomicrograph of another sample of the new superhard form of boron suboxide at a magnification of 1330X.
Figure 11:
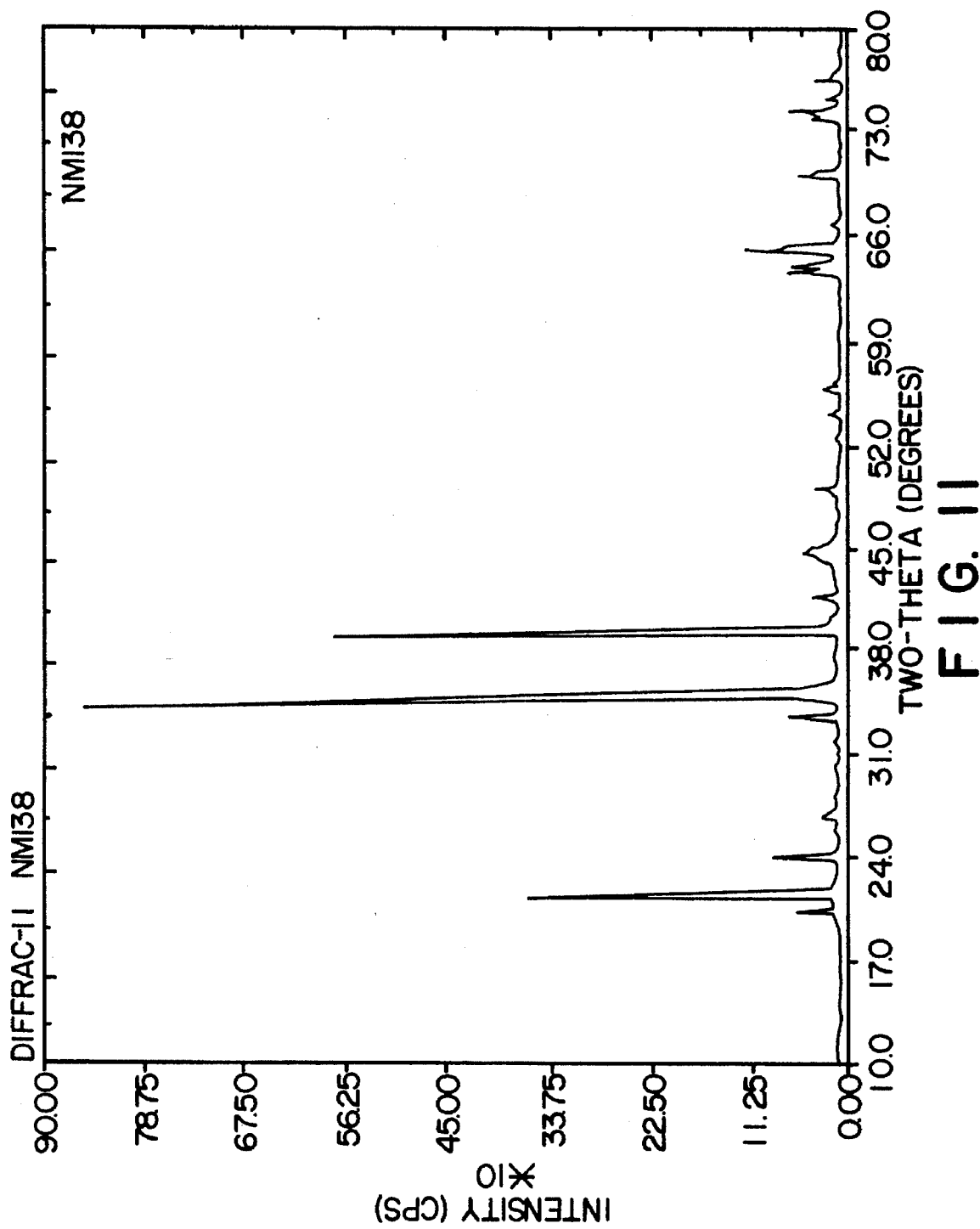
FIG. 11 is a plot of the X-ray diffraction pattern obtained with copper K-alpha radiation of the sample shown in FIG. 10.

The NM138 sample was tested for hardness with a Knoop indentor and was found to have an average $KHN_{100}$ value of about 4250 kg/mm$^2$. The sample was also inspected visually under a magnification of 1330X with an optical microscope and a photograph thereof is shown in FIG. 10. The same microstructure and constituents are seen in FIG. 10 as were seen in FIG. 8. The NM138 sample was also subjected to X-ray diffraction analysis and the results thereof are shown in FIG. 11. These tests confirm the conclusions reached in Example 1.

Figure 12:
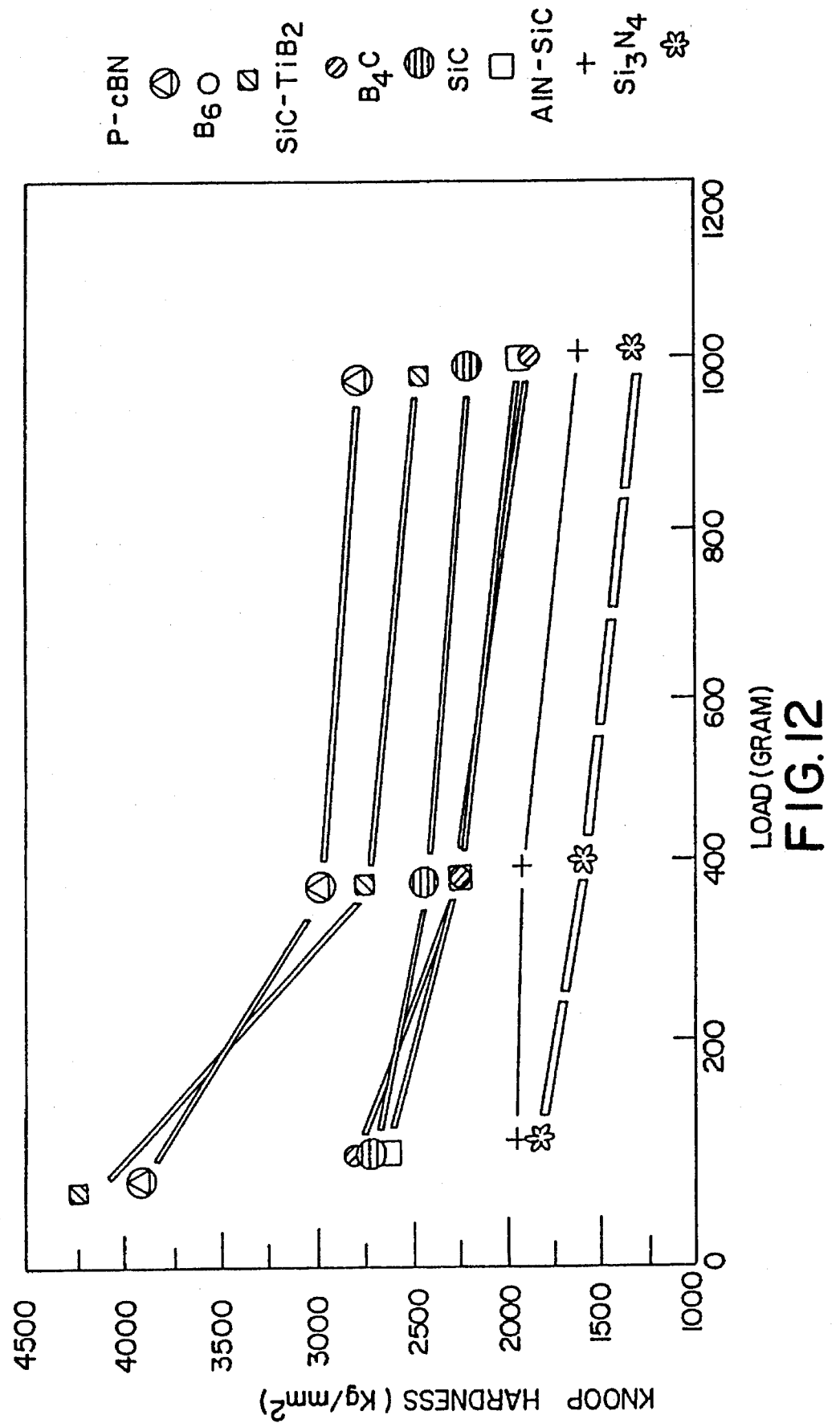
FIG. 12 is a plot of average hardness (KHN) values for a variety of materials including the new superhard form of boron suboxide.

The average Knoop hardness of the NM138 sample was measured under various loads. FIG. 12 illustrates the results obtained. Also illustrated are average Knoop hardness values that were measured for various other well-known abrasive materials under the same indentation conditions. FIG. 12 shows that the average KHN value for the NM138 sample of boron suboxide is higher than that of polycrystalline cubic boron nitride at a load of 100 g, and is much higher than the hardness values measured for all the other abrasive materials at all loads. The greater decrease in hardness of this new material at 400 g load is believed to be due to porosity or other flaws in the test material.

COMPARISON EXAMPLE 1

In order to compare the results obtained for the new superhard form of boron suboxide with previously known forms of boron suboxide, Example 1 was repeated except this time essentially pure (99.9%) elemental boron powder was mixed with pure boron oxide. In this case, the mixture was subjected to a temperature of 1960° C. and a pressure of 3200 psi for 3 hours. All other conditions were the same as in Example 1. The sample produced in this manner was given the designation NM176 and was tested as before.

Figure 13:
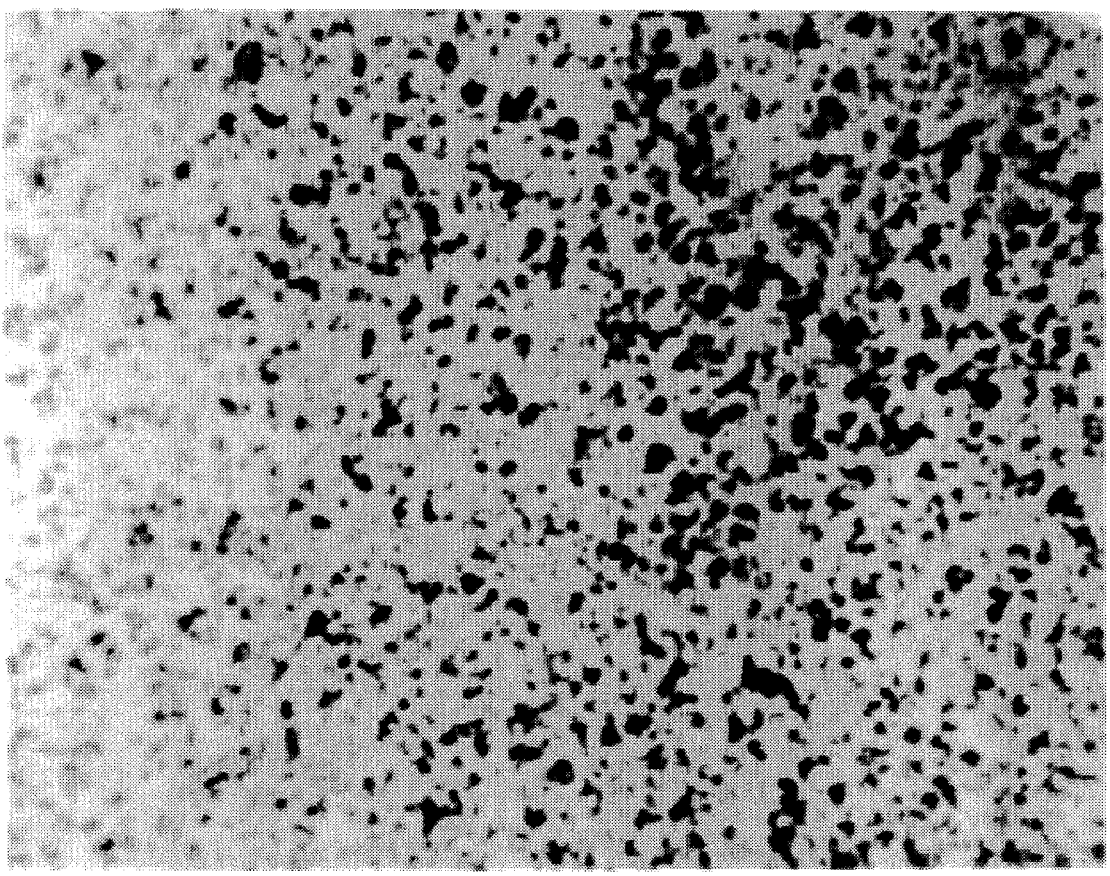
FIG. 13 is a photomicrograph at a magnification of 1330X of a comparison sample of boron suboxide which is not superhard and was made using high purity boron (99.9% B) mixed with boron oxide to $B_6O$ stoichiometry. Excess boron was not added in this case to compensate for the surface boron oxide layer on boron, nor was a sintering aid used.
Figure 14:
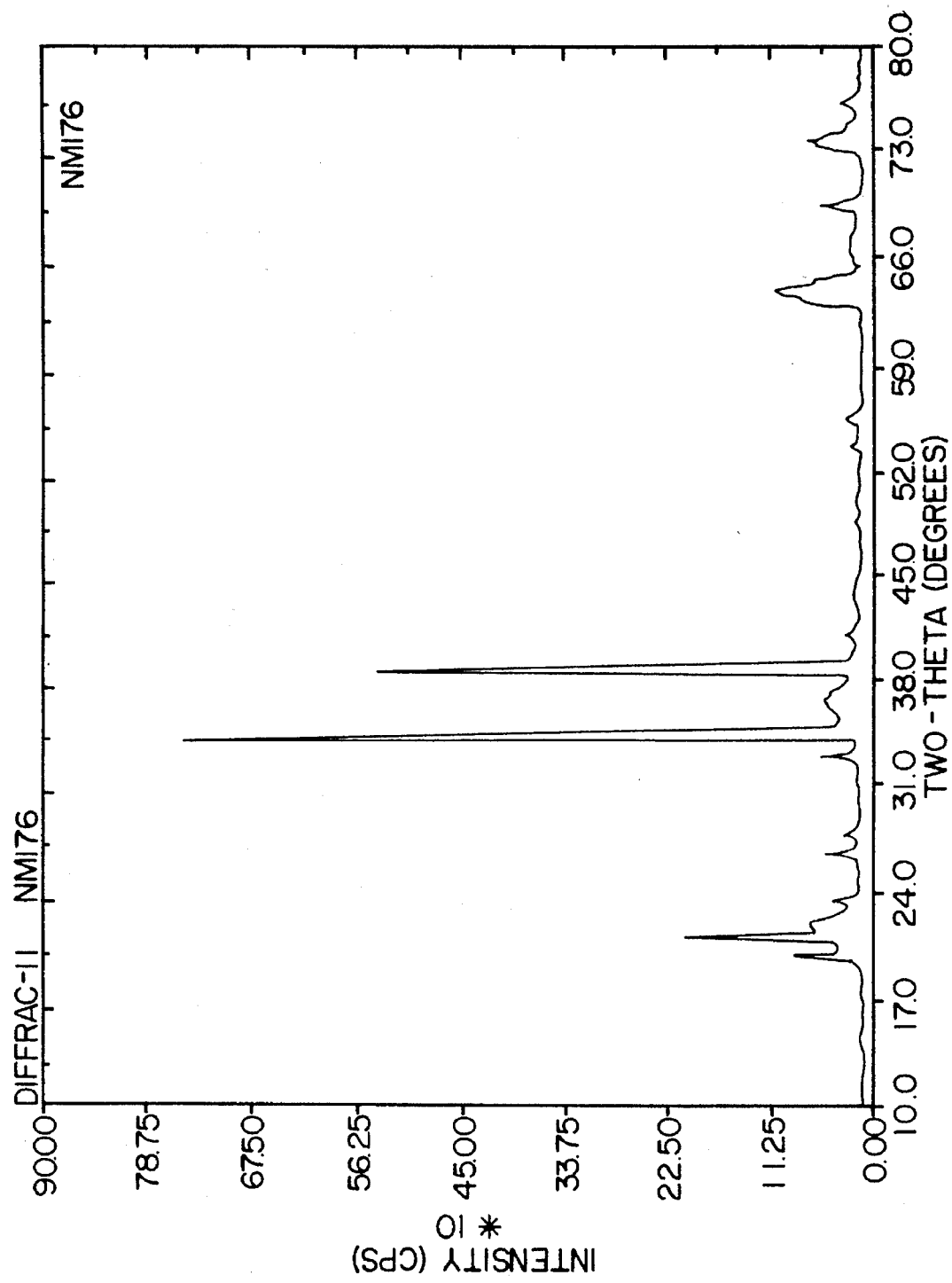
FIG. 14 is a plot of the X-ray diffraction pattern obtained with copper K-alpha radiation of the comparison sample shown in FIG. 13.

The average $KHN_{100}$ value obtained for the NM176 sample was only 1568 kg/mm$^2$. A photograph of the sample under a magnification of 1330X is shown in FIG. 13. This photograph shows the presence of considerable porosity. This indicates that the material is not well sintered. The X-ray diffraction pattern shown in FIG. 14 confirms that NM176 is not a well crystallized material as many of the peaks are broad compared with the X-ray diffraction patterns of the NM086 and NM138 samples. This may indicate an incomplete chemical reaction and the presence of intermediate phases.

EXAMPLE 3

In another set of experiments, NM086 samples were subjected to a friability test. The NM086 samples were removed from the die, crushed and then sized. The grit was then subjected to a friability test. The same friability test was conducted on a sample of single crystal CBN and on an $Al_2O_3$ grit made from seeded gel.

The NM086 material was found to have desirable friability characteristics as shown in Table I.

TABLE I

| | Friability Index (50 seconds) | | |
|---|---|---|---|
| Size (Mesh) | NM086 | CBN | $Al_2O_3$ (Norton SG) |
| −60/+80 | 13 | 17 | 35 |
| −100/+120 | 46 | 37 | 62 |
| −120/+140 | 26 | 35 | 27 |

The friability index is a measure of toughness and is useful for determining the grit's resistance to fracture during grinding. The values in this table are the percent of grit retained on a screen after friability testing. This procedure consists of a high frequency, low load impact test and is used by manufacturers of diamond grit to measure the toughness of the grit. Larger values indicate greater toughness. The data show that the NM086 material has friability characteristics similar to that of the CBN tested (BZN-I from General Electric Co.).

EXAMPLE 4

In another set of experiments, grit made from NM086 material was subjected to a grinding test. In a first test, the NM086 material was used in making a resin bond grinding wheel.

Wet grinding of a D-2 steel workpiece was conducted at a traverse speed of 600 in./min and a crossfeed of 0.05 inches. The results for the NM086 material and for the $Al_2O_3$(Norton SG) are shown in Table II.

TABLE II

| Abrasive (Mesh) | Depth of Cut (Inches) | Grinding Ratio | Average Peak Power (Watts) |
|---|---|---|---|
| NM086 −60/+200 | 0.0003 | 17.4 | 800 |
|  |  | 18.5 | 800 |
| $Al_2O_3$ (Norton SG) −60/+200 | 0.0003 | 21.7 | 590 |
|  |  | 21.2 | 640 |
| NM086 −60/+200 | 0.0005 | 13.4 | 1000 |
|  |  | 12.6 | 1160 |
| $Al_2O_3$ (Norton SG) −60/+200 | 0.0005 | 24.7 | 700 |
|  |  | 24.6 | 660 |

A similar vitreous bond grinding wheel test was conducted using another sample of NM086 material. In this case, the workpiece was 52100 steel and the infeed was 0.001 inches/second. The results are shown in Table III.

TABLE III

| Abrasive (Mesh) | Grinding Ratio | Average Peak Power (Watts) |
|---|---|---|
| NM086 −100/+230 | 4.2 | 3160 |
| CBN −100/+230 (BZN-I) | 284 | 2465 |
| $Al_2O_3$ (Norton SG) −100/+230 | 227 | 1704 |

The results from the grinding experiments demonstrate that $B_6O$ having a $KHN_{100}$ value of at least about 3800 $kg/mm^2$ can act as an abrasive grit. However, the results of the tests shown in Table 3 are somewhat disappointing in comparison to CBN and $Al_2O_3$ (Norton SG). More recent experiments have shown that the reason $B_6O$ was sometimes inferior to CBN and $Al_2O_3$ (Norton SG™) is because of oxidation of the $B_6O$ at high temperatures.

EXAMPLE 5

In an Al390 turning test a $B_6O$ cutting tool insert (SNE433) performed similarly to a $Si_3N_4$ insert with the same geometry.

EXAMPLE 6

In the previous examples, the novel superhard boron suboxide material (e.g., samples NM086 and NM138) was prepared from a mixture of essentially pure 99.99% boron oxide powder and boron powder of relatively low purity (90–92%), the main impurity in the boron powder being magnesium which is believed to act as a sintering aid. The average particle size of the boron powder was somewhat less than 5 microns. Furthermore, the low purity boron and high purity boron oxide were mixed in proportions so as to provide a mixture containing 6 parts boron to 1 part oxygen.

When processed as described above, the final product was superhard boron suboxide having an average grain size of 18–30 microns, interspersed with a small amount (less than 5%) of magnesium borate, and some free boron.

Through subsequent research it has been found that an improved form of fine grain superhard boron suboxide can be prepared. This improved form of superhard boron suboxide comprises a homogeneous composition of $B_6O$ throughout, and has a grain size of approximately 1 to 3 microns. This fine grain form of superhard boron suboxide was prepared by mixing as described earlier high purity (99.9%) boron oxide with high purity (99.9%) boron powder having an average particle size of less than 1 micron in a proportion so as to provide 12 parts boron to 1 part oxygen. The excess boron was needed in order to compensate for a boron oxide layer which formed on the surface of the boron particles. Without the addition of any sintering aid, the mixture of boron and boron suboxide was then loaded into the reaction cell illustrated in FIG. 1 and subjected to a temperature of 2100° C. and a pressure of 3500 psi for 20 minutes.

Figure 15:
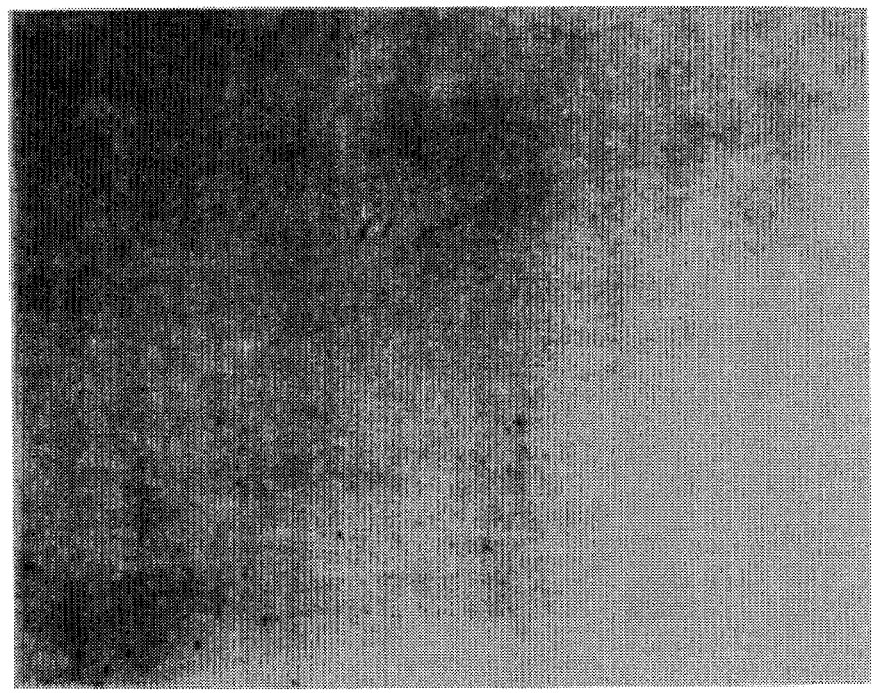
FIG. 15 is an unetched photomicrograph at a magnification of 1330X of a fine grain form of the new superhard boron suboxide.

FIG. 15 is a typical photomicrograph of the product prepared in this way. It consists of a fine grain $B_6O$ with less than 10% of an unidentified boron-rich base. The $KHN_{100}$ hardness values measured for the fine grain boron suboxide ranged from 3853 $kg/mm^2$ to 4288 $kg/mm^2$.

Figure 16:
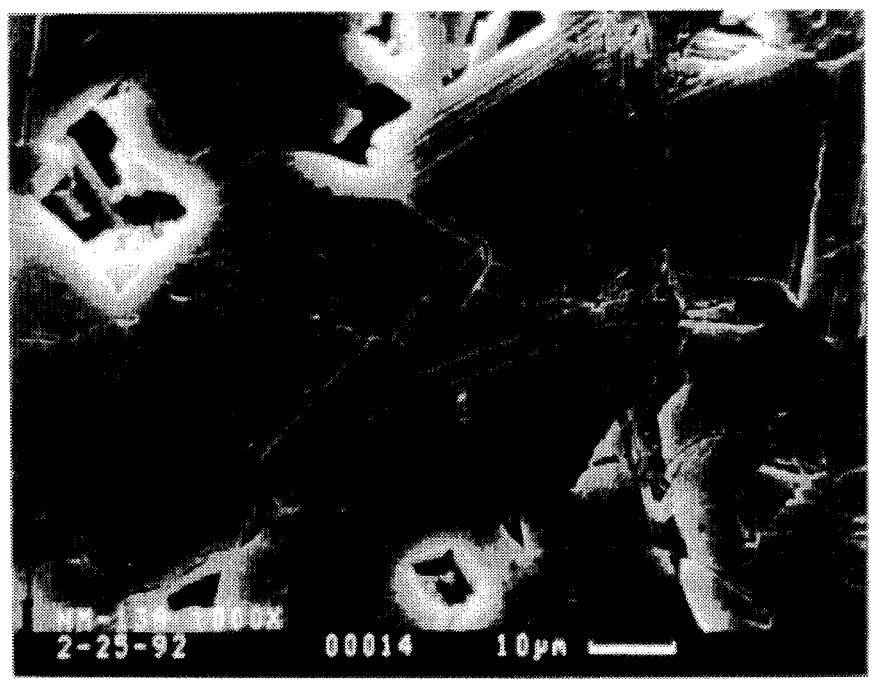
FIG. 16 is an etched photomicrograph at a magnification of 1000X of large grain boron suboxide.
Figure 17:
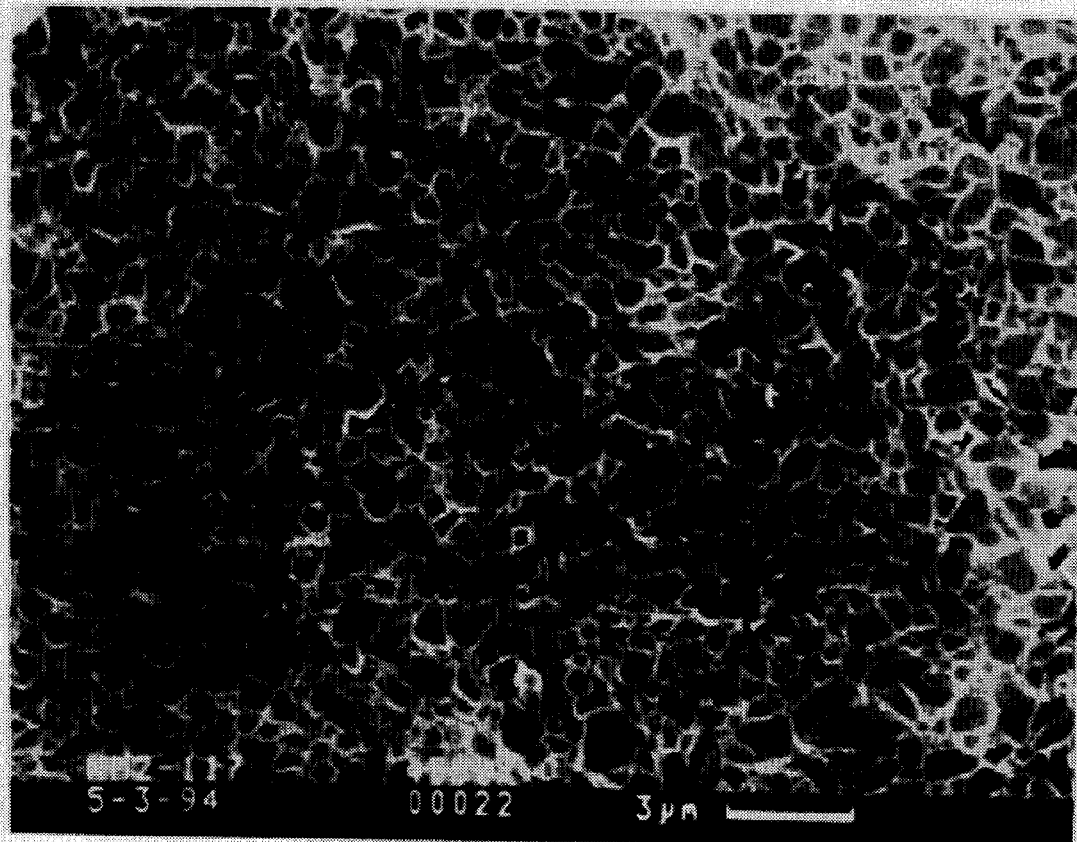
FIG. 17 is an etched photomicrograph at a magnification of 4500X of fine grain boron suboxide.

FIGS. 16 and 17 show the difference in grain size between the large grain and the fine grain boron suboxide materials. The large grain boron suboxide shown in FIG. 16 has an average grain size of approximately 18–30+ microns, while the fine grain boron suboxide shown in FIG. 17 has an average grain size of approximately 1–5 microns.

Figure 18:
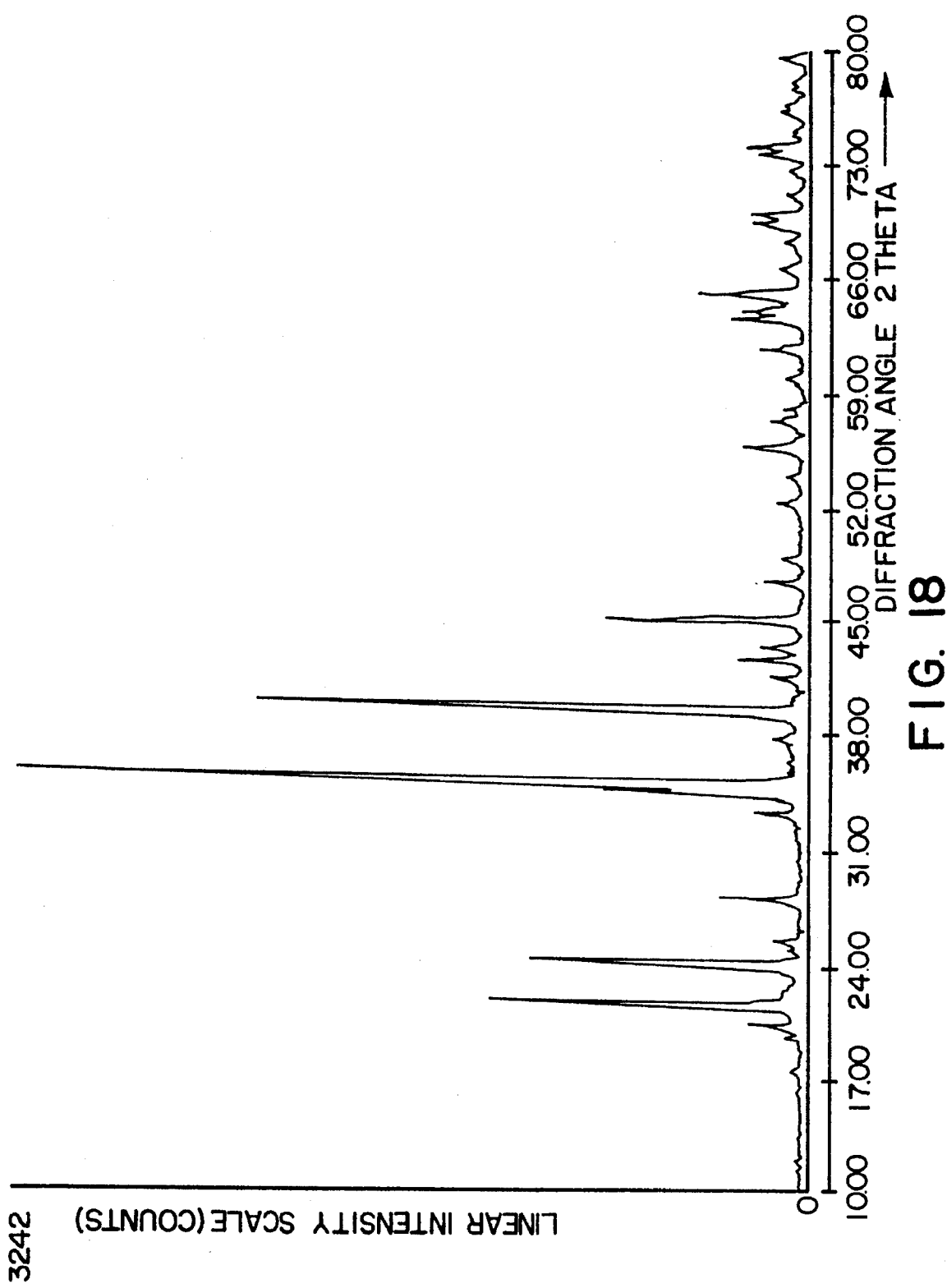
FIG. 18 is a plot of the X-ray diffraction pattern obtained with copper K-alpha radiation of fine grain boron suboxide.
Figure 19:
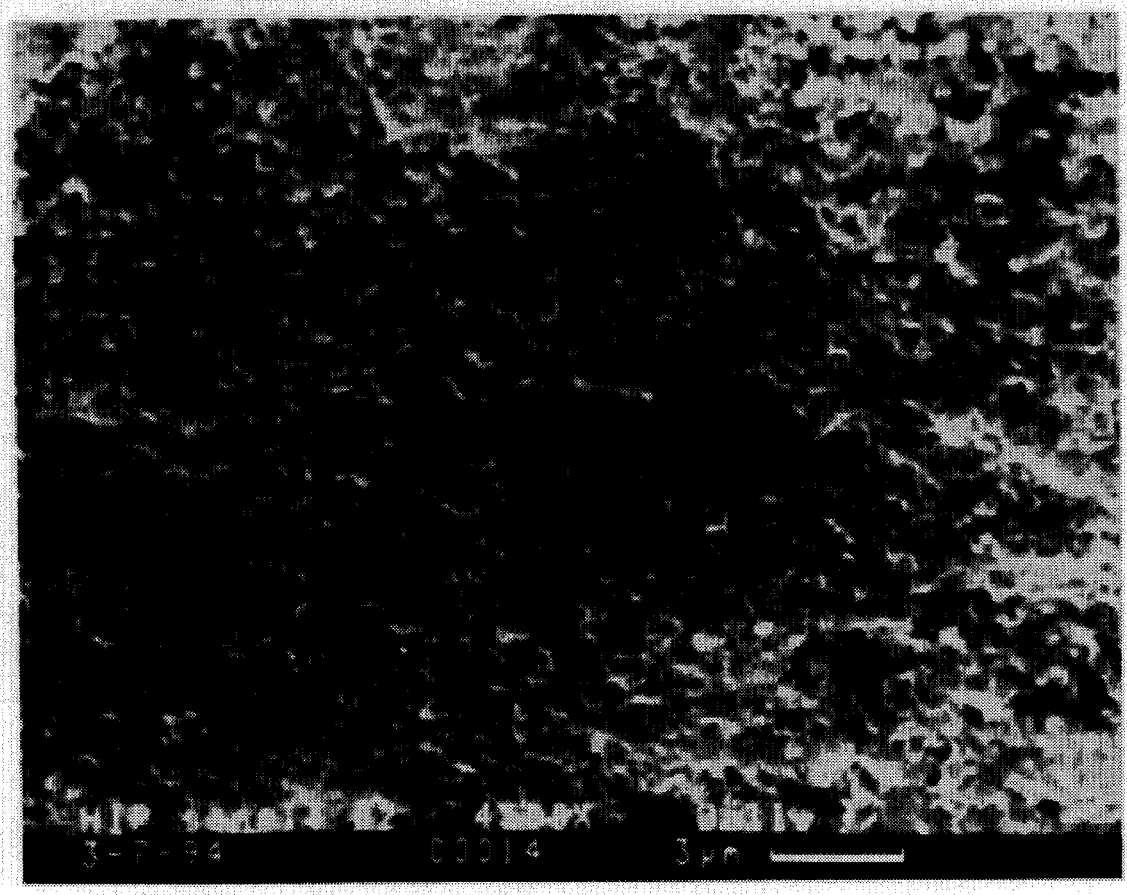
FIG. 19 is an etched photomicrograph at a magnification of 1330X of the novel boron suboxide material made by a hot isostatic pressing method.

FIG. 18 shows an X-ray diffraction pattern for the fine grain boron suboxide. Differences in the X-ray diffraction patterns may also be observed.

EXAMPLE 7

An experimental design was also conducted wherein the factors pressure, temperature, boron to oxygen ratio and purity of boron powder were examined to determine their effects on hardness. Pressure was found to affect hardness the least, i.e., hard materials could be produced over a range of pressures. As a result of this finding, it is postulated that it may also be possible to produce $B_6O$ materials with hardness greater than $KHN_{100}$=3800 $kg/mm^2$ with other apparatuses which are capable of operating at pressures greater than 6000 psi (for example pressures up to 50,000 psi which are typical of hot isostatic pressing.)

Up to now, all of the methods described for producing superhard boron suboxide involved hot pressing of boron and boron oxide powders along an axial direction in a cell such as that shown in FIG. 1. It has also been discovered that superhard boron suboxide can be produced in a hot isostatic pressing process similar to that described in U.S. Pat. No. 4,446,100 (Adlerborn et al.) According to this process, a mixture of substantially pure boron (99.9%) and boron oxide (99.9%) in a stoichiometric ratio of 12 parts boron to 1 part oxygen as described in connection with Example 5 was first cold isostatic pressed to form a green body product. The green body product was then coated with a 2–3 mm boron nitride layer (containing BN, alcohol, and organic binder). Subsequent layers 2–3 mm thick of combined boron nitride and silicon carbide, boron nitride, and combined boron nitride and silicon carbide were also applied. The sample was then encapsulated in glass and subjected to hot isostatic pressing as described in U.S. Pat. No. 4,446,100. The hot isostatic pressing was performed at a temperature of 1950° C. and a pressure of 30,000 psi for 30 minutes.

Fine grain boron suboxide having an average Knoop hardness $KHN_{100}$ of 3804 kg/mm² was produced by this method. The fine grain boron suboxide produced by this method closely resembled the fine grain boron suboxide produced by the hot pressing method described in Example 6. However, the boron suboxide made by hot isostatic pressing was comprised of grains ranging from approximately 0.1 to 0.5 microns which is substantially smaller than the average grain size of the hot pressed material.

EXAMPLE 8

The grinding performance of 220 grit boron suboxide (BxO) at 200 concentration was compared to seeded $Al_2O_3$ and CBN (same size and concentration) on D3 Steel. Because the performance was greatly inferior to CBN, the boron suboxide (BxO) was only compared to seeded $Al_2O_3$ on 4340 Steel and tungsten carbide work materials. On all three materials the unit downfeed was 0.5 mils for a material removal rate of 0.080 in³/min/in.

| Method of Test: | |
| --- | --- |
| Machine: | Brown and Sharpe Surface Grinder |
| Wheel Speed: | 5000 s.f.p.m. |
| Table Traverse: | 600 i.p.m. |
| Unit Crossfeed: | 50 mils |

The D3 Steel had a hardness of Rc 60-63, and the 4340 Steel had a hardness of Rc 58-60. The coolant used was a Master chemical trim VHPE300@ 5% ratio with city water for steel grinding, and W&B E55@ 2.5% ratio with city water for carbide grinding.

TABLE IV

| | G-ratio | % G | Power | % P |
| --- | --- | --- | --- | --- |
| 4340 Steel | | | | |
| Seeded $Al_2O_3$ | 90 | 100 | 220 | 100 |
| BxO | 12 | 13 | 520 | 236 |
| D3 Steel | | | | |
| Seeded $Al_2O_3$ | 16 | 100 | 610 | 100 |
| BxO | 9 | 56 | 860 | 141 |
| CBN | 460 | 2875 | 380 | 62 |
| Tungsten Carbide | | | | |
| Seeded $Al_2O_3$ | 0.39 | 100 | 900 | 100 |
| BxO | 0.27 | 69 | 1800 | 82 |

A comparative grinding wheel test was performed with boron suboxide (BxO) and diamond as the abrasive on tungsten carbide. As boron suboxide (BxO) has some reactivity with iron, it was postulated that such reactivity would not reduce the performance of boron suboxide (BxO) on nonferrous materials. The boron suboxide (BxO) and diamond used were both 100/120 mesh at 100 concentration.

| Test Conditions: | |
| --- | --- |
| Machine: | Norton S-3 or B & S Surface Grinder |
| Wheel Speed: | 5000 s.f.p.m. |
| Table Traverse: | 600 i.p.m. |

| -continued | |
| --- | --- |
| Test Conditions: | |
| Unit Downfeed: | 0.5 mils |
| Total Downfeed: | 50 mils |
| Coolant: | W & B E55 @ 1:40 or equivalent |

The tests were discontinued after the initial pre-grind because the boron suboxide (BxO) wheel wear was extraordinarily high, see Table V.

TABLE V

| Abrasive | Wheel Wear | Material Removed | Peak Power |
| --- | --- | --- | --- |
| Diamond | 3.6 mils | 48.4 mils | 760 watts |
| BxO | 97.7 mils | 0.7 mils | 1440 watts |

EXAMPLE 9

Two lapping slurries were prepared, one with boron suboxide (BxO) of the invention, and a second using GE300 diamond abrasive powder from the General Electric Company; the diamond abrasive powder having a particle size range of about 2 to 5 microns, and the boron suboxide (BxO) having a particle size range of 1 to 10 microns. The abrasive concentration in the two slurries was a standard concentration of 10 carats (2 grams) per 100 ml of slurry. The fluid vehicle in of the two slurries was 80% by weight of ethylene glycol and 20% by weight of butyl cellosolve. The slurries had a viscosity of 40 centipoise as measured using a Brookfield Viscosimeter using spindle No. 21.

The materials lapped with each slurry were 12L14 steel, 4140 steel, and aluminum. The lapping was with a Lapmaster 12 machine manufactured by Crane Manufacturing Company and using a hardened steel lapping plate rotating at 60 rpm. The abrasive slurry was supplied to the lapping plate with a peristaltic pump at a rate of 0.7 ml per minute. All the materials were subjected to lapping with each abrasive for a period of 8 hours with a total area lapped per rm of 18.65 in² (0.0121 m²). The lapping pressures were 2.83 psi ($19.5 \times 10^3$ Pa) on 4140 steel, 21.5 psi ($18.8 \times 10^3$ Pa) on the 12L14 material, and 1.28 psi ($8.8 \times 10^3$ Pa) on the aluminum. The lapping pressure was different for each material but the same for all three abrasives on a given material. The results are shown in Table V.

TABLE VI

| | Material Removal (mg/cm²) | | |
| --- | --- | --- | --- |
| | 12L14 Steel | 4140 Steel | 390 Aluminum |
| Diamond | 2161.5 | 1982.6 | 1789.1 |
| Boron Suboxide | 1905.9 | 1489.7 | 1690.5 |

The invention boron suboxide (BxO) lapping powder removes less material for a given amount of abrasive than does the diamond abrasive. However, as explained above, the boron suboxide (BxO) performs similarly to the diamond despite the broad differential in hardness.

EXAMPLE 10

Three lapping slurries were prepared, one with boron suboxide (BxO) of the invention, a second using GE300 diamond abrasive powder from the General Electric Company, and a third incorporating boron carbide as the abrasive; they all had a particle size range of about 2 to 5 microns. The abrasive concentration in all three slurries was a standard concentration of 10 carats (2 grams) per 100 ml of slurry. The fluid vehicle in all three slurries was 80% by weight of ethylene glycol and 20% by weight of butyl cellosolve. The slurries had a viscosity of 40 centipoise as measured using a Brookfield Viscosimeter using spindle No. 21.

The materials lapped with each slurry were 4140 steel, silicon carbide, and glass. The lapping was with a Lapmaster 12 machine manufactured by Crane Manufacturing Company and using a hardened steel lapping plate rotating at 60 rpm. The abrasive slurry was supplied to the lapping plate with a peristaltic pump at a rate of 0.7 ml per minute. All the materials were subjected to lapping with each abrasive for a period of 8 hours. The lapping pressure was different for each material but the same for all three abrasives on a given material. On the 4140 steel the pressure was 2.83 psi ($19.5 \times 10^3$ Pa) on the silicon carbide 1.28 psi ($8.8 \times 10^3$ Pa), and 2.15 psi ($14.8 \times 10^3$ Pa) for the glass. The results were as follows:

TABLE VII

| | Material Removal (mg/cm$^2$) | | |
|---|---|---|---|
| | 4140 | SiC | Glass |
| Diamond | 90.2 | 72.2 | 418.8 |
| Boron Carbide | 70.4 | 32.9 | 301.8 |
| Boron suboxide | 156.7 | 88.4 | 590.3 |

EXAMPLE 11

Boron suboxide (BxO) was tested with fluids to determine the preferred carrier for use with boron suboxide (BxO) compositions and mixtures, and to compare the results with the use of these carriers with monocrystalline diamond. The preferred fluid for use with 310 S Steel contained 25% by volume polyalkylene glycol and 75% by volume of ethylene glycol ether. The concentration of abrasive in the slurry was (24 carats) 4.8 grams of boron suboxide (BxO) composition or monocrystalline diamond per 500 ml of carrier. The viscosity of all the slurries tested was the same. The boron suboxide (BxO) abrasive and the monocrystalline diamond used had a particle size of 3–5 microns. The results are listed in Table VIII.

TABLE VIII

| | Values | | | |
|---|---|---|---|---|
| | BxO | Diamond | BxO | Diamond |
| Pressure (psi) | 6 | 6 | 1 | 1 |
| Results | | | | |
| Surface Roughness (micro inch) | 1.66 | 1.43 | 1.80 | 1.55 |
| Surf. Rough. (Max) (micro inch) | 8.59 | 7.48 | 9.42 | 7.77 |
| Stock Removal (mg/inch 2) | 3,239 | 273 | 1571 | 99 |
| Stock Removal Ratio | 11.85 | 1 | 15.82 | 1 |

EXAMPLE 12

The performance of boron suboxide (BxO) was compared to the performance of cubic boron nitride (MB BZN 550) in honing 310 stainless steel work material (the cBN stones were purchased from Sunnen Products Co of St. Louis, Mo.).

Honing machine/test conditions: honing tests took place on a manually operated honing machine model MBB-1650C made by Sunnen of St. Louis, Mo., with MB30 honing oil made by Sunnen of St. Louis, Mo. flowing at 1.43 liters per minute, at 800 rpm for a period of 12 minutes.

Honing stick information: All abrasives were 200/230 mesh, and the bond used was standard conventional bond containing cobalt, copper, tin and silver. The concentrations of boron suboxide and cBN were 36 and 24, respectively. The honing sticks were further formed and fired by conventional means.

The following test results were observed as shown in Table IX:

TABLE IX

| Abrasive Type | Material Removed (inches) in 2 minutes | Finish (Ra) | Honing Ratio* |
|---|---|---|---|
| cBN | .0050 | 1.29 um | 1200 |
| BxO | .0034 | 0.71 um | 1900 |

*Honing Ratio is a ratio of the weight of work material removed to the weight of abrasive lost.

EXAMPLE 13

The performance of boron suboxide (BxO) was compared to the performance of cubic boron nitride (BZN 550) in honing 4140 steel work material (the cBN stones were purchased from Sunnen Products Co. of St. Louis, Mo.)

Honing machine/test conditions: honing tests took place on a manually operated honing machine model MBB-1650C made by Sunnen of St. Louis, Mo., with MB30 honing oil made by Sunnen of St. Louis Mo., flowing at 1.43 liters per minute, at 800 rpm for a period of 4 minutes.

Honing stick information: All abrasives were 200/230 mesh, and the bond used was standard conventional bond containing cobalt, copper, tin and silver. The concentrations of boron suboxide and cBN were 75 and 60, respectively. The honing sticks were further formed and fired by conventional means.

The following test results were observed as shown in Table X:

TABLE X

| Abrasive Type | Material Removed (inches) | Finish (Ra) |
|---|---|---|
| cBN | .0095 | 0.43 um |
| BxO | .0063 | 0.20 um |

EXAMPLE 14

Boron suboxide (BxO) worked well in superfinishing applications. Superfinishing stones using 13 um boron suboxide grit at 135 concentration in a commercial vitreous bond and fired under commercial conditions demonstrated the ability to cut 52100 bearing steel.

The superfinishing test equipment was developed by Norton Company to simulate superfinishing conditions. The part was rotated at 300 rpm with an oscillation speed of 1750 strokes per minute, and an amplitude of 2 mm.

The results are as follows as shown in Table XI:

TABLE XI

| Pressure | Stock Removal | G-ratio |
| --- | --- | --- |
| 25 psi (minimum) | 5–6 um | 0.6 |
| 20 psi (maximum) | 1 um | 1.5–14 |

EXAMPLE 15

Boron suboxide (BxO) is used to make a fixed abrasive by the following techniques.

a) The boron suboxide, or a mixture of boron suboxide and other abrasive(s), e.g. SiC, is blended with polyvinyl alcohol, foamed, then cured to hard cellular block. This abrasive pad is used in lapping aluminum disc, silicon disc, etc. The abrasive content of this product is varied from 5% to 75% by volume. The abrasive grit size is typically 150 microns or finer. Another example of this type is a mixture of said abrasive and polyurethane bonding material.

b) Boron suboxide, either alone or mixed with other abrasive grain, is either orderly or randomly placed on top of a flexible substrate film which contains bonding resin(s) or polymer(s). After curing, the abrasive is permanently held on the substrate. The coated substrate is cut into various shapes, such as disc, strip, belt, etc., suitable for any desired lapping/polishing applications. The typical size of abrasive grit is 850 microns or finer.

c) Boron suboxide, either alone or mixed with other abrasive grain, is mixed with a copper based alloy to an abrasive concentration ranging from 5% to 75% by volume. The typical size of abrasive grit is 500 microns or finer. The mixture is heated to an elevated temperature to form a solid segment, plate, or wheel. This plate may or may not have a backing core. This metal bonded product can be fitted to lappers or polishing machines to finish various work materials, such as metals, ceramics, glass, stones, etc.

d) Similar to c), but the bond system contains mostly glass.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A lapping slurry comprising a vehicle that is a fluid under lapping conditions and, dispersed therein, a boron suboxide powder wherein the particles of the powder have an average particle size between from about 0.005 micron to about 500 microns and wherein said particles are made up of crystallites finer than about 150 microns.

2. The lapping slurry in claim 1, wherein said boron suboxide composition comprises at least about 70% by weight of boron suboxide (BxO).

3. The lapping slurry in claim 1, including up to about 30% by weight of a material selected from the group consisting of beryllium, magnesium, calcium, strontium, barium, yttrium, and mixtures thereof present in said boron oxide as the element or in the form of a compound of said elements.

4. The lapping slurry in claim 1, including an abrasive selected from the group consisting of fused aluminum oxide, seeded aluminum oxide, sintered aluminum oxide, silicon carbide, boron carbide, silicon nitride, cubic boron nitride, mono and polycrystalline diamond, zirconium oxide, metal carbides and mixtures thereof.

5. The lapping slurry of claim 1 wherein the powder particles are made up of a number of fine crystallites with an average size of from about 0.01 to about 60 microns.

6. The lapping slurry of claim 1 wherein the vehicle is a liquid at ambient temperatures.

7. The lapping slurry of claim 1 wherein the boron suboxide represents from about 0.1 to about 25% of the weight of the slurry.

\* \* \* \* \*